US009094365B2

(12) United States Patent
Gmuender et al.

(10) Patent No.: US 9,094,365 B2
(45) Date of Patent: *Jul. 28, 2015

(54) METHOD AND APPARATUS FOR RESOURCE LOCATOR IDENTIFIER REWRITE

(71) Applicant: Dell Software Inc., Round Rock, TX (US)

(72) Inventors: John E. Gmuender, San Jose, CA (US); Huy Minh Nguyen, Fountain Valley, CA (US); Joseph H. Levy, Salt Lake City, UT (US); Michael B. Massing, San Jose, CA (US); Zhong Chen, Fremont, CA (US); David M. Telehowski, Sunnyvale, CA (US)

(73) Assignee: Dell Software Inc., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,002

(22) Filed: Mar. 25, 2013

(65) Prior Publication Data

US 2013/0227070 A1   Aug. 29, 2013

Related U.S. Application Data

(60) Continuation of application No. 12/785,364, filed on May 21, 2010, now Pat. No. 8,429,301, which is a division of application No. 12/143,210, filed on Jun. 20, 2008, now Pat. No. 7,752,336, which is a division (Continued)

(51) Int. Cl.
*G06F 15/16* (2006.01)
*H04L 29/08* (2006.01)
(Continued)

(52) U.S. Cl.
CPC ............... *H04L 67/02* (2013.01); *H04L 29/06* (2013.01); *H04L 29/12009* (2013.01);

(Continued)

(58) Field of Classification Search
CPC ...................................................... H04L 61/301
USPC ......................................... 709/246; 726/2, 26
See application file for complete search history.

(56) References Cited

U.S. PATENT DOCUMENTS

| 5,805,803 A | 9/1998 | Birrell et al. |
| 5,835,718 A | 11/1998 | Blewett |

(Continued)

FOREIGN PATENT DOCUMENTS

| EP | 1 083 722 | 3/2001 |
| WO | WO 03/036913 | 5/2003 |
| WO | WO 2004057445 A2 * | 7/2004 |

OTHER PUBLICATIONS

PCT/US2003/041216, International Search Report mailed Oct. 18, 2004.

(Continued)

*Primary Examiner* — Dustin Nguyen
(74) *Attorney, Agent, or Firm* — Lewis Roca Rothgerber LLP

(57) ABSTRACT

A method and apparatus for resource locator identifier rewrite have been presented. A security device receives from a resource host over a non-secure hypertext transfer protocol (HTTP) session a response to a request received from a client over a secure HTTP session. The response includes a uniform resource locator (URL) that is supposed to be for a resource host, but the URL does not designate a secure resource access protocol and the resource host requires the secure resource access protocol. The URL is located in the response and modified to designate the secure resource access protocol. After modification, the response is transmitted via the secure resource access protocol session to the client.

20 Claims, 23 Drawing Sheets

Related U.S. Application Data of application No. 10/331,806, filed on Dec. 30, 2002, now Pat. No. 7,412,539.

(60) Provisional application No. 60/434,776, filed on Dec. 18, 2002.

(51) Int. Cl.
*H04L 29/06* (2006.01)
*H04L 29/12* (2006.01)

(52) U.S. Cl.
CPC ....... *H04L 29/12594* (2013.01); *H04L 61/301* (2013.01); *H04L 63/0281* (2013.01); *H04L 63/168* (2013.01); *H04L 67/2804* (2013.01); *H04L 69/329* (2013.01)

(56) References Cited

U.S. PATENT DOCUMENTS

| | | |
|---|---|---|
| 5,963,915 A | 10/1999 | Kirsch |
| 6,081,900 A | 6/2000 | Subramaniam et al. |
| 6,098,093 A | 8/2000 | Bayeh et al. |
| 6,985,936 B2 | 1/2006 | Agarwalla et al. |
| 6,993,559 B2 | 1/2006 | Jilk et al. |
| 7,002,565 B2 | 2/2006 | Allen et al. |
| 7,003,565 B2 | 2/2006 | Hind et al. |
| 7,412,539 B2 | 8/2008 | Gmuender et al. |
| 7,752,336 B2 | 7/2010 | Gmuender et al. |
| 8,429,301 B2 | 4/2013 | Gmuender et al. |
| 2002/0156922 A1 | 10/2002 | Chan et al. |
| 2002/0188743 A1 | 12/2002 | Schaffrath |
| 2003/0046586 A1 | 3/2003 | Bheemarasetti et al. |
| 2003/0051142 A1 | 3/2003 | Hidalgo et al. |
| 2003/0115365 A1 | 6/2003 | Lindsey |
| 2010/0235543 A1 | 9/2010 | Gmuender et al. |

OTHER PUBLICATIONS

PCT/US2003/041216, International Preliminary Examination Report mailed Apr. 5, 2005.
U.S. Appl. No. 10/331,806, Office Action mailed Dec. 10, 2007.
U.S. Appl. No. 10/331,806, Final Office Action mailed Jul. 27, 2007.
U.S. Appl. No. 10/331,806, Office Action mailed Dec. 28, 2006.
U.S. Appl. No. 12/143,210, Office Action mailed Sep. 17, 2009.
U.S. Appl. No. 12/785,364, Final Office Action mailed Oct. 23, 2012.
U.S. Appl. No. 12/785,364, Office Action mailed Mar. 27, 2012.

\* cited by examiner

METHOD AND APPARATUS FOR RESOURCE LOCATOR IDENTIFIER REWRITE

CROSS-REFERENCE TO RELATED APPLICATIONS

The present application is a continuation and claims the priority benefit of U.S. patent application Ser. No. 12/785,364 filed May 21, 2010, now U.S. Pat. No. 8,429,301, which is a divisional and claims the priority benefit of U.S. patent application Ser. No. 12/143,210 filed Jun. 20, 2008, now U.S. Pat. No. 7,752,336, which is a divisional and claims the priority benefit of U.S. patent application Ser. No. 10/331,806 filed Dec. 30, 2002, now U.S. Pat. No. 7,412,539, which claims the priority benefit of U.S. provisional application 60/434,776 filed Dec. 18, 2002, the disclosures of which are incorporated herein by reference.

BACKGROUND OF THE INVENTION

1. Field of the Invention

The invention relates to the field of communication. More specifically, the invention relates to communication networks.

2. Description of the Related Art

Hypertext transfer protocol (HTTP) is a resource access protocol. A resource access protocol is a defined set of rules for retrieval of resources from the Internet. A resource can be an image, a hypertext markup language (HTML) page, a Java applet, program, etc. HTTP is considered to reside at the presentation layer and/or the application layer of the OSI reference model. HTTP provides guidelines for exchanges between clients and resource hosts including request and response messages. A typical HTTP exchange includes a client requesting a resource and a resource host responding with the resource. In certain scenarios, the resource host will transmit a response that redirects the client to a different resource than the one originally requested by the client. For example, a resource host may not find a requesting client's cookie in the resource host's database, and, as a result, sends a response to the requesting client that redirects the client to a login page.

Since the exchanges between clients and resource hosts often include sensitive information, security measures are applied to certain exchanges. For security, HTTP is coupled with the Secure Sockets Layer (SSL) (also known as Transport Layer Security (TLS)). From the perspective of the OSI reference model, HTTP sits over SSL. This coupling is referred to as HTTPS. After HTTP has generated a message, HTTP passes the message to SSL, which performs security operations (e.g., encryption, hashing, etc.) on the message.

HTTP uses a uniform resource locator (URL) for retrieval of a resource. A URL is an address of a resource accessible on the Internet. A URL includes a resource access protocol identifier, a resource host identifier, a path identifier, and a resource identifier. In the URL "http://www.host.com/folder/main.html," the resource access protocol identifier is "http"; the resource host identifier is "www.host.com"; the path identifier is "folder"; and the resource identifier is "main.html."

The resource access protocol identifies HTTP as the resource access protocol to be used to retrieve the identified resource.

The resource host indicated by the resource host identifier is a resource host, or server, identified as "www.host.com." Although the resource host identifier used above is a domain name, a resource host identifier may be a network address, such as an Internet Protocol (IP) address. A resource host identifier may identify a port in addition to a resource host. For example, the following two URLs identify the same resource, but the second indicates a port:
1) http://www.host.com/main.html
2) http://www.host.com:80/main.html.

The indicated port is the appropriate port for communication with the identified resource host in accordance with the identified resource access protocol. The default port for HTTP is port 80 (the default port for HTTPS is port 443), so an HTTP message with the above example URL will be communicated to the resource host identified as "www.host.com" with the port 80.

A URL does not necessarily have to include a path identifier or a resource identifier because the resource may be in a default path and have a default name. Using the previous examples, the URL "http://www.host.com/" identifies the same resource as the previous example URLs, assuming that "folder" is the default path and that "main.html" is the default resource.

The HTTP protocol and HTTPS protocol were designed such that the response (including a redirect) to a request will use the same protocol as the request used. Thus, if the request used HTTP, then the URLs of the response will use HTTP. In contrast, if the request used HTTPS, then the URLs of the response will use HTTPS. While this works for many situations, it creates problems in certain environments.

FIG. 1 (Prior Art) is a diagram of an example redirect response retransmission. In FIG. 1, a first, second, and third columns indicate resource messages respectively transmitted and received by a client 101, a content switch 103 that performs HTTP proxy, and a server 105. A hyperlink with a URL "https://www.host.com/res1.htm" is activated at the client 101, typically a personal computer. The resource host identifier is resolved to an Internet Protocol (IP) address and an HTTPS session is opened with the content switch 103. After the HTTPS session is opened, a request message 107 with "GET res1.htm" is transmitted from the client 101 to the content switch 103. The content switch 103 receives the request 107 on port 443, decrypts the request 107, and forwards the decrypted request 107 over an HTTP session to the server 105.

The content switch 103 that performs HTTP proxy and the server 105 are typically network elements in the same local area network (LAN), which is separate from the client 101. The client 101 communicates with the LAN over a public network (e.g., the Internet). The server 105 is one of many servers in a server farm. The server 105 and the other servers in the server farm are not burdened with security measures since the owner of the server farm and content switch 103 relies on the content switch 103 for security. The content switch 103 is exposed to the outside world and protects the server farm by performing HTTP proxy. The owner has dedicated resources of the servers in the server farm, including the server 105, to serving of requests instead of performing security operations. The content switch 103 performs HTTP proxy for the servers in the server farm and determines the appropriate server for a received request. In FIG. 1A, the server 105 is the appropriate server for the request 107.

The server 105 transmits a response 111 with redirect URL "http://www.host.com/res2.htm" to the content switch 103. The content switch 103 encrypts the response 111 and transmits the encrypted response 111 back over the HTTPS session to the client 101. The client 101 receives the HTTPS response 111, decrypts the response 111, and closes the HTTPS session. Assuming the redirect URL is selected, the client 101 resolves the host name and opens an HTTP session with the content switch 103 in accordance with the resource access protocol indicated by the redirect URL. The client 101 transmits a request message 113 with "GET res2.htm" to the content switch 103.

The content switch 103 receives the request message 113 on the port 80 because the content switch is running a network service to listen for traffic received on port 80. Traffic received on port 80 is redirected. In response to the request 113, the content switch 103 generates a response message 119 that indicates a redirect URL "https://www.host.com/res2.htm". The content switch 103 transmits the response 119 back to the client 101 over the HTTP session initially opened by the client 101.

The client 101 closes the HTTP session and opens a HTTPS session with the content switch 103. The client 101 generates a request message 121, encrypts the request message 121, and transmits the encrypted request message 121 to the content switch 103.

This redirect retransmission punches a hole in the security provided by HTTPS. Since the client switches to HTTP, the data transmitted from the client is unencrypted. It is assumed that the client is transmitting sensitive information (e.g., a credit card number, passwords, bank account numbers, residential address, phone numbers, etc.) since HTTPS is typically invoked for protecting communications that will most likely include sensitive information. Due to the redirect rewrite retransmission, the client is transmitting sensitive data without encryption, which can be captured and used with ease.

In addition, the number of exchanges taking place between the client 101 and the content switch 103 illustrated in FIG. 1 are unnecessary "extra" exchanges to force the client to transmit an acceptable request, which can cause substantial impact to the content switch's performance in the real world. These extra exchanges between a content switch and thousands of sessions for thousands of clients impact performance of the content switch and introduce latency in a client's wait time for a response. Both the client machine and the content switch must process an additional message per redirect. The additional redirect may also agitate users and deter them from returning to a website.

FIG. 2 (Prior Art) is an example of a client in a protected network receiving a response message with a URL that indicates HTTPS. In FIG. 2, four columns respectively indicate a client 201, an intrusion detection system (IDS) 202, a firewall 203 with a proxy, and a server 205. The firewall 203 connects external networks to the client 201. The IDS 202 sniffs traffic transmitted and received by the client 201. The server 205 transmits a response 207 with a URL "https://www.host.com/res1.htm" to the firewall 203. The firewall 203 receives the response 207 and forwards the response 207 to the client 201 (assuming the client 201 was the requesting client). If the firewall 203 has a HTTPS session open with the server 205, then the firewall 203 decrypts the response 207 before forwarding it to the client 201. The IDS 202 analyzes the response 207. Assuming the URL in the response 207 is selected, the client 201 resolves the host name of the URL and opens a HTTPS session with the firewall 203 in accordance with the URL. If the client 151 does not support SSL (e.g., corporate entities that wish to snoop traffic with an IDS, sometimes do not enable SSL on their client machines so that their traffic can be snooped by the IDS), then the client 201 cannot request the resource. The client 201 generates a request message 209, encrypts the request 209, and transmits the request 209 to the firewall 203. Since the request 209 is encrypted, the IDS 202 must be capable of decrypting the request 209 to analyze it, allow the request to pass without analysis, or hold the request. If the IDS 202 allows the request to pass, then the firewall 203 opens a HTTPS session with the server 205 and transmits the request 209 to the server 205. Hence, the request 209 has bypassed the IDS 202.

This security architecture is typically employed in a corporate environment. A corporate entity needs to protect its systems from being infected and/or prevent access to its systems by external and/or internal malignant elements while still enabling its employees to access resource beyond its local area network. The corporate entity also needs to control the types of resources or material that enters its network at the request of its employees. Therefore, a corporate entity employs both a firewall with proxy support and an intrusion detection system to protect its network from external hacking and internal violations of its computer use policy. Unfortunately, as shown in FIG. 2, an IDS can be bypassed with encryption.

Service provides also used another mechanism with a security flaw to accommodate users. In order to avoid agitating users with error messages and increasing latency, service providers allowed a pass through for messages that were not encrypted. For this mechanism, a content switch is configured to listen for traffic on both ports 80 and 443. Traffic received on port 80 is forwarded to the corresponding servers while traffic received on port 443 is decrypted. Hence, users are not inconvenienced with error messages and increased latency, but users were possibly transmitting sensitive information without encryption.

SUMMARY OF THE PRESENT INVENTION

A method and apparatus for resource locator identifier rewrite is described. According to one aspect of the invention, a method in a network security device provides for the receipt from a resource host over a non-secure hypertext transfer protocol (HTTP) session a response to a request received from a client over a secure HTTP session. The response includes a uniform resource locator (URL) that is supposed to be for a resource host, but the URL does not designate a secure resource access protocol and the resource host requires the secure resource access protocol. The URL is located in the response and is modified to designate the secure resource access protocol. The response is transmitted via the secure resource access protocol session to the client.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Methods and apparatuses for resource locator identifier rewrite are described. According to various embodiments of the invention, resource locator rewrite insures that the resource access protocol indicated by the resource locator identifiers in a response, whether in the header and/or embedded in the body of the response, is the resource access protocol that should govern a request for the resource located by that resource locator identifier. Resource locator identifier (RLI) rewrite can be applied for both forward rewrite (non-secure to secure) and reverse rewrite (secure to non-secure). Furthermore, forward RLI rewrite can be applied for rewriting RLIs in the header of a message (e.g., redirects) and/or for rewriting RLIs embedded in the body of a message.

Figure 1:
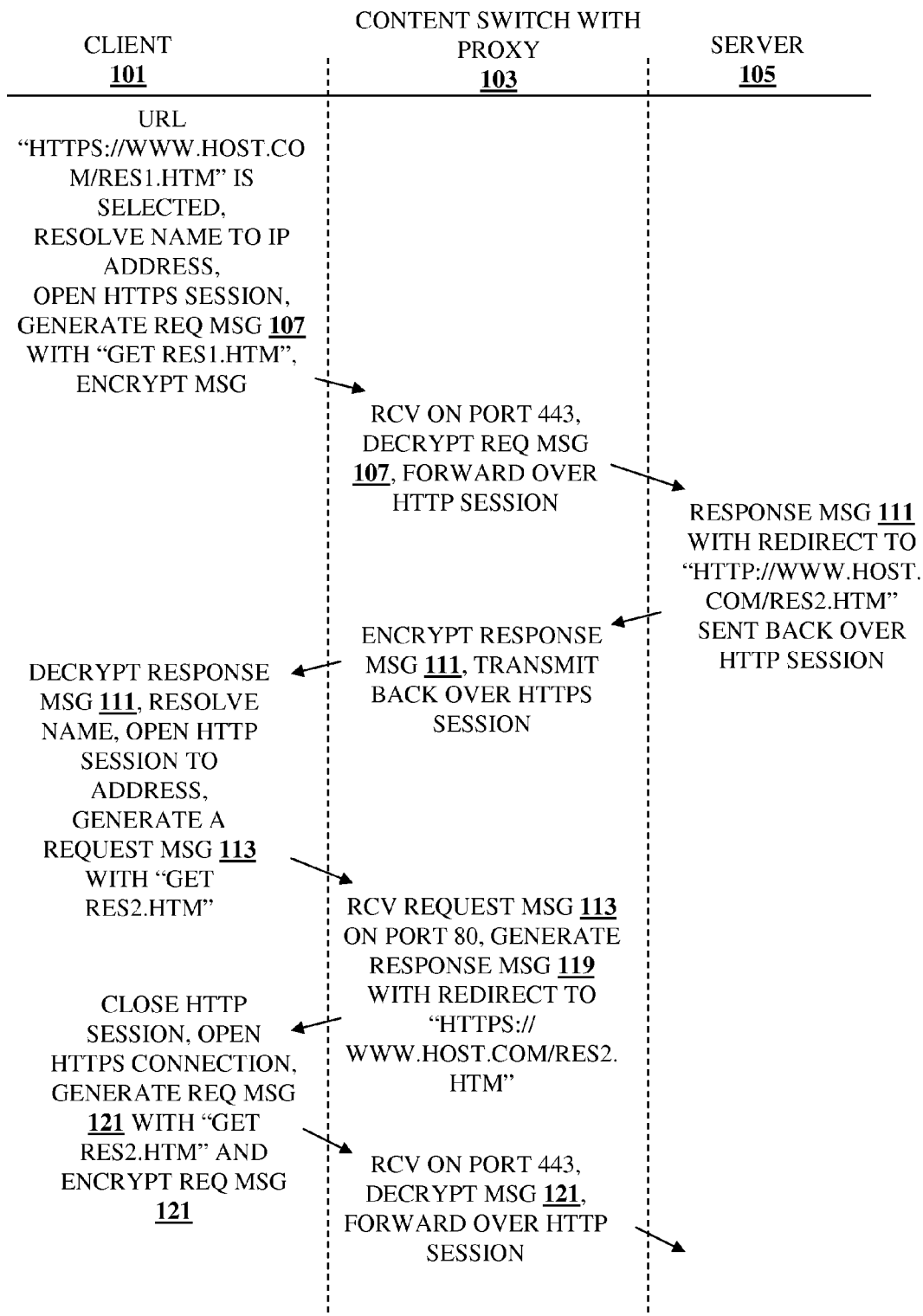
FIG. 1 (Prior Art) is a diagram of an example redirect response retransmission.
Figure 2:
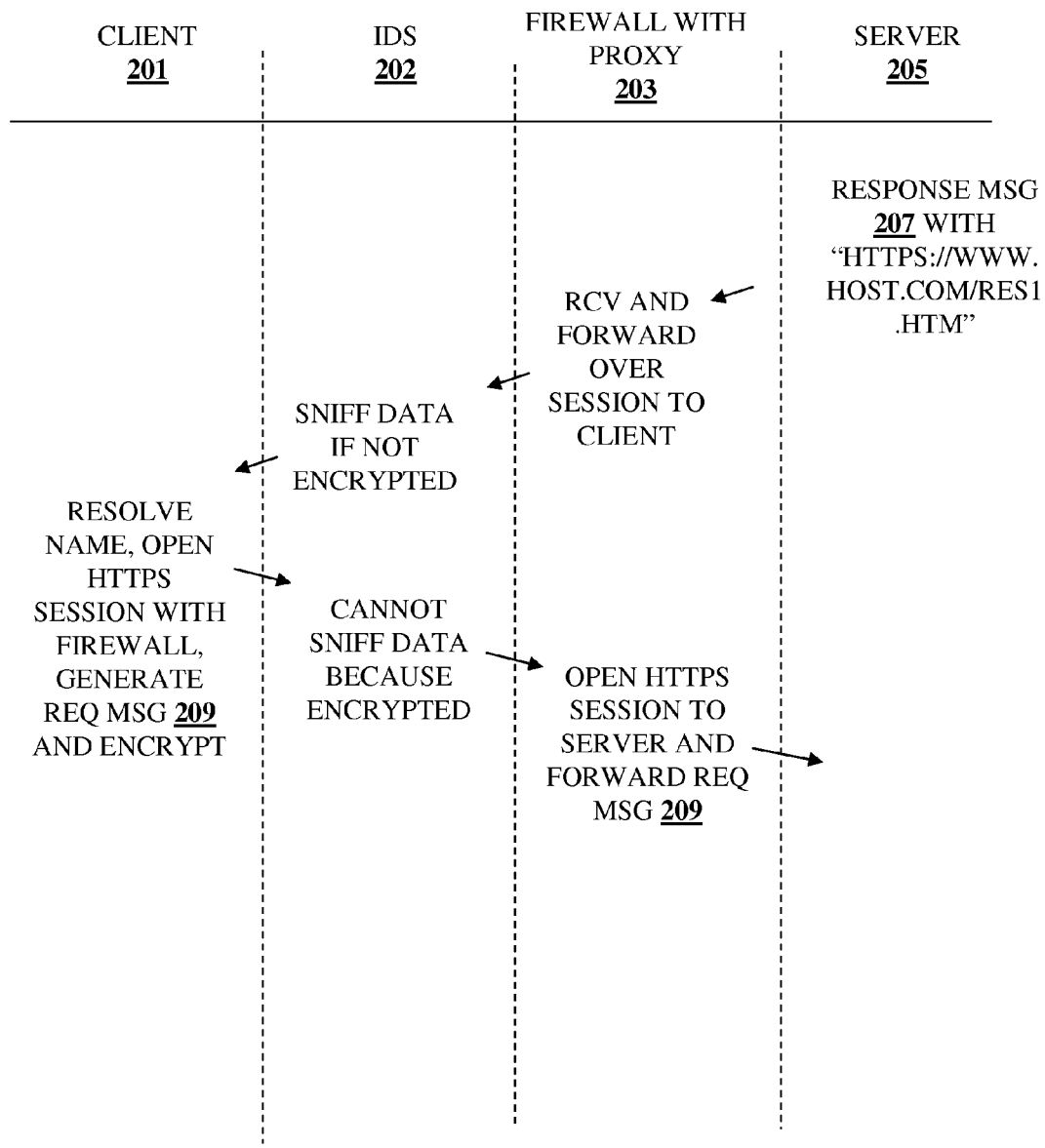
FIG. 2 (Prior Art) is an example of a client in a protected network receiving a response message with a URL that indicates HTTPS.
Figure 3A:
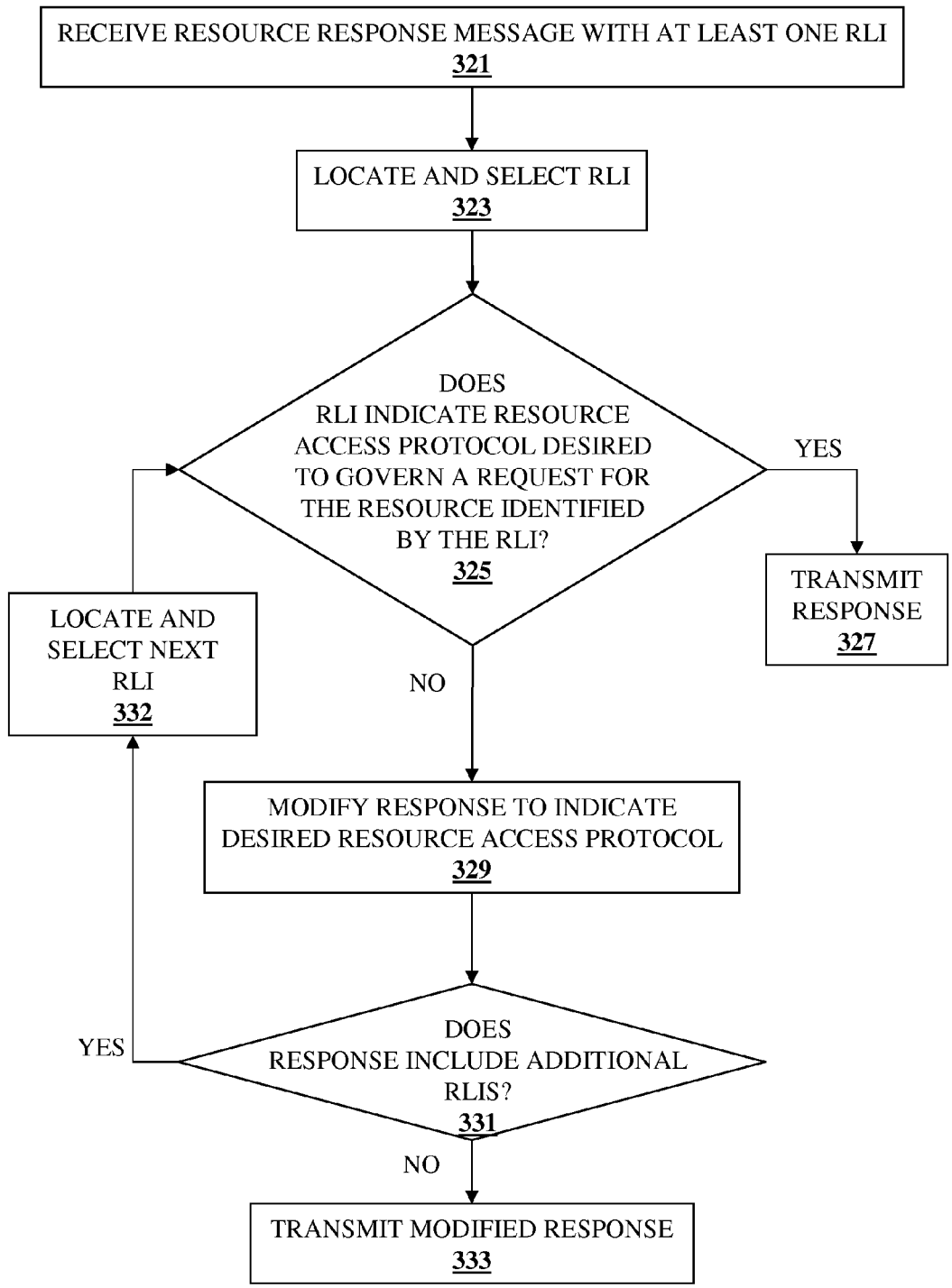
FIG. 3A is an exemplary flowchart for RLI rewrite according to one embodiment of the invention.
Figure 3B:
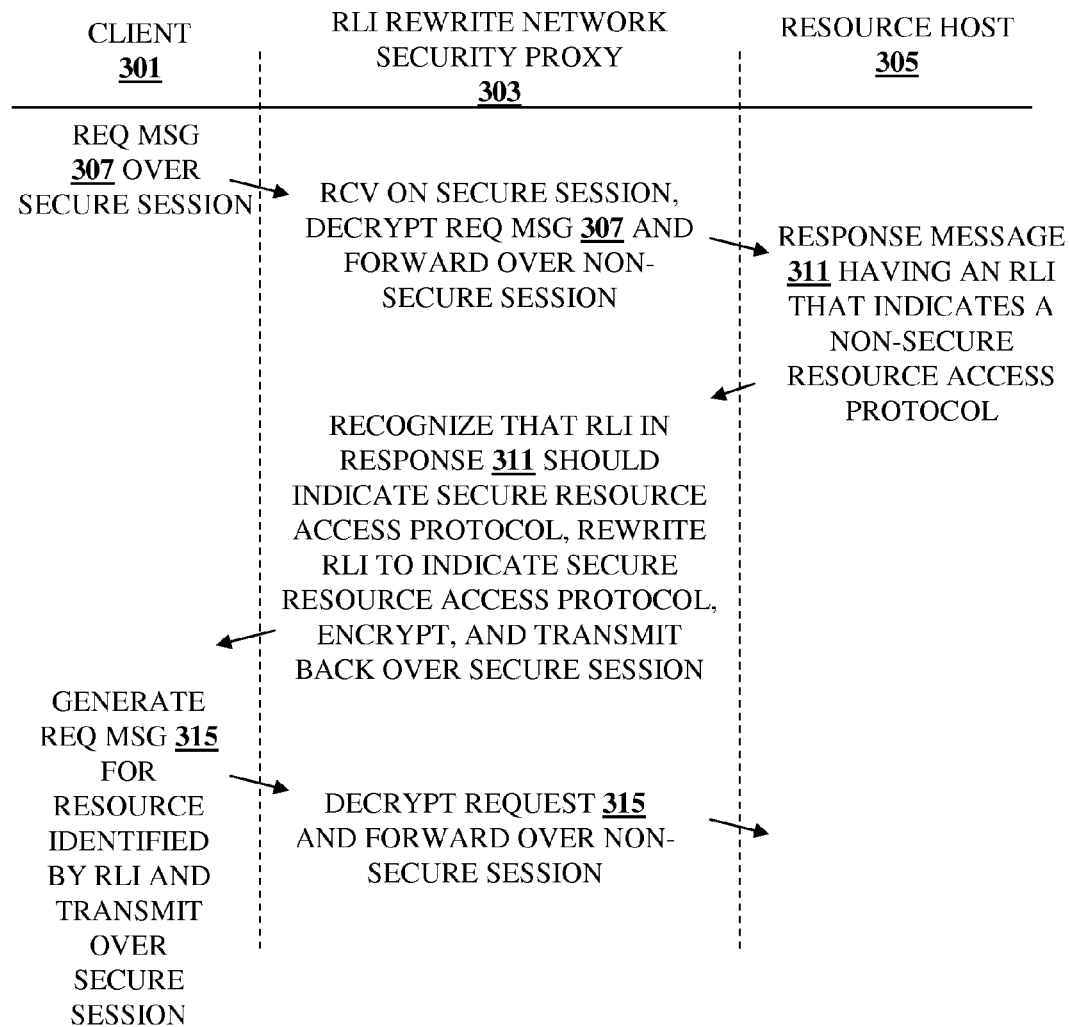
FIG. 3B is an exemplary diagram of forward RLI rewrite for redirect according to one embodiment of the invention.
Figure 3C:
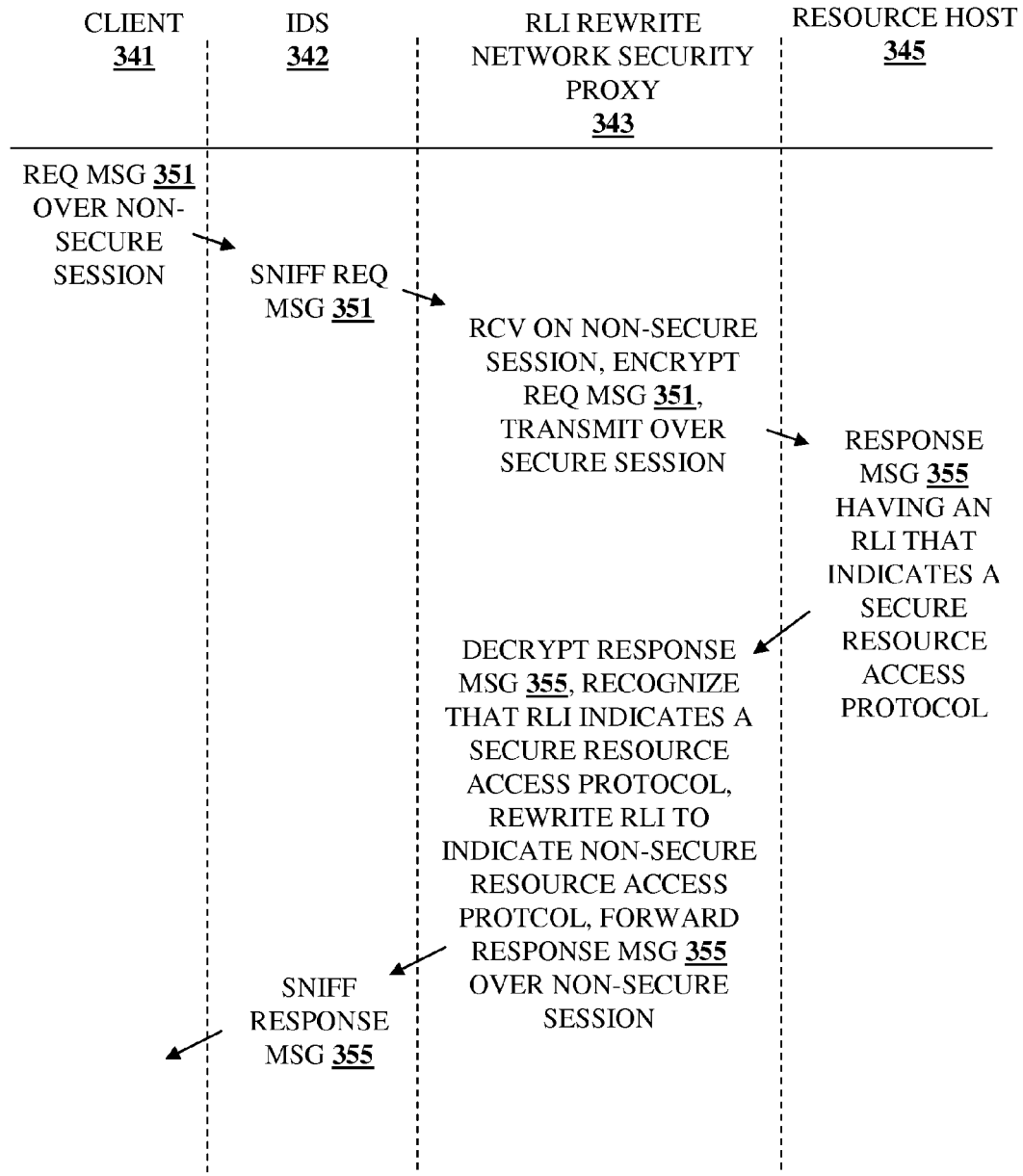
FIG. 3C is an exemplary diagram of reverse RLI rewrite according to one embodiment of the invention.

FIGS. 3A-3C illustrate RLI rewrite for different applications. FIG. 2A illustrates a generic RLI rewrite that can be applied regardless of the scenario. FIG. 2B illustrates RLI rewrite as applied to forward redirect rewrite and FIG. 2C illustrates RLI rewrite as applied to reverse rewrite. Other scenarios, such as forward RLI rewrite with persistent connection and forward RLI rewrite without persistent connections, are described in later Figures.

FIG. 3A is an exemplary flowchart for RLI rewrite according to one embodiment of the invention. At block 321, a response with at least one RLI (e.g., a URL) is received. At block 323, a RLI is located and selected. At block 325, it is determined if the selected RLI indicates a resource access protocol desired to govern a request for the resource identified by the RLI. For example, assume the RLI is a URL that indicates HTTP and a network device (e.g., a content switch, a security offloader, a security accelerator, a firewall, etc.) that performs RLI rewrite has been configured and/or programmed so that requests for the resource identified by the URL should be governed by HTTPS. The network device will determine that the desired access protocol for the resource is HTTPS. Likewise, if the URL indicates HTTPS and the network device has been configured and/or programmed so that requests for the resource should be governed by HTTP, then the network device will determine that HTTP is the appropriate request governing resource access protocol. If it is determined that the RLI does not indicate the appropriate request governing resource access protocol, then control flows to block 327. If it is determined that the RLI indicates the appropriate request governing resource access protocol, then control flows to block 329.

At block 327, the response is transmitted.

At block 329, the response is modified to indicate the appropriate request governing resource access protocol. At block 331, it is determined if the response includes additional RLIs. If the response includes additional RLIs, then control flows back to block 333. If the response does not include additional RLIs, then control flows to block 333.

At block 333, the modified response is transmitted. In one embodiment of the invention, modifications to the response only take place at the layer of the resource access protocol (e.g., the RLI is rewritten only). In another embodiment of the invention, the modifications take place at the layer of the resource access protocol and at lower layers, which will be described in more detail herein. Alternative embodiments may perform the modification(s) in other layers.

FIG. 3B is an exemplary diagram of forward RLI rewrite for redirect according to one embodiment of the invention. In FIG. 3B, a client 301 transmits resource request message 207 over a secure resource access protocol session (e.g., a HTTPS session) to a resource locator identifier (RLI) rewrite network security proxy 303. The RLI rewrite network security proxy 303 receives the request 307 on the secure resource access protocol session and decrypts the request 307. After decrypting the request 307, the proxy 303 forwards the request 307 over a non-secure resource access protocol session to a resource host 305 that is behind the RLI rewrite network security proxy 303. The resource host 305 transmits a response 311 having a RLI that indicates a non-secure resource access protocol back over the non-secure resource access protocol session to the RLI rewrite network security proxy 303. The RLI rewrite network security proxy 303 recognizes that the RLI in the response 311 should indicate a secure resource access protocol, which will be described in more detail later. The RLI rewrite network security proxy 303 rewrites the RLI to indicate the secure resource access protocol, encrypts the response 311, and transmits the encrypted response 311 with the rewritten RLI back over the secure resource access protocol session to the client 301.

The client 301 requests the resource identified by the RLI in the response 311. A request 315 is generated and transmitted over the secure resource access protocol session to the RLI rewrite network security proxy 303. Regardless of whether the RLI is a redirect or a non-redirect, the RLI rewrite network security proxy 303 does not bounce a response back to the client 301 to force the client 301 to switch session types because the client 301 is requesting in accordance with the appropriate request governing resource access protocol, due to the RLI rewrite performed by the RLI rewrite network security proxy 303 on the response 311. The RLI rewrite network security proxy 303 decrypts the request 315 and forwards the decrypted request message 315 to the resource host 305.

As can been seen from FIG. 3B, the client does not transmit a request to the RLI rewrite network security proxy that is not encrypted. Hence, there no longer is a hole in the security provided by the secure resource access protocol. That is to say, the information exchanges between a client and a resource host remain secure if so desired. Maintaining information security prevents exposure of sensitive information and protects the owners of that information. Furthermore, additional message exchanges between a client and a network security device protecting a resource host are eliminated. The elimination of the operations resulting from the additional message exchanges reduces resource consumption, improves performance of network security devices involved in the message exchanges, and provides a less time consuming experience for users requesting resources from resource hosts (i.e., resource hosts located behind network security devices). In addition, resource hosts remain secure behind network security devices without modifying applications on resource hosts and increasing their burdens.

The RLI rewrite technique illustrated in FIG. 3A can also be applied for reverse RLI rewrite, which is described with reference to FIG. 3C.

FIG. 3C is an exemplary diagram of reverse RLI rewrite according to one embodiment of the invention. In FIG. 3C, four columns respectively indicate a client 341, an IDS 342, a RLI rewrite network security proxy 343, and a resource host 345. The client 341 transmits a request message 351 over a non-secure resource access protocol session established between the client 341 and the proxy 343. An IDS 342 between sniffs data, including the request 351, transmitted from the client 341 to the proxy 343. The proxy 343 receives the request 351 on the non-secure resource access protocol session, encrypts the request 351, and transmits the request over a secure resource access protocol session to the resource host 345.

The resource host 345 generates a response message 355 that has a RLI that indicates a secure resource access protocol. The resource host transmits the response 355 over the secure resource access protocol session to the proxy 343. The proxy 343 receives the response 355 on the secure resource access protocol session, decrypts the response 355, and recognizes that the response 355 indicates a secure resource access protocol, which is not the appropriate request governing resource access protocol from the perspective of the proxy 343. Therefore, the proxy 343 rewrites the RLI to indicate a non-secure resource access protocol and forwards the decrypted response 355 with the rewritten RLI to the client 341. Since the response 355 is decrypted, the IDS 342 can analyze the response 355 without having to support decryption.

As can be seen in FIG. 3C, RLI rewrite prevents resource messages (both requests and responses) from bypassing security devices, such as an intrusion detection system, and transmitting responses with RLIs that a client cannot request because the client does not support the indicated resource access protocol.

Forward RLI Rewrite

As previously stated, RLI rewrite can be applied for RLIs in the header of a message, such as for redirect, and/or for RLIs in the body.

Header Forward RLI Rewrite

Figure 4A:
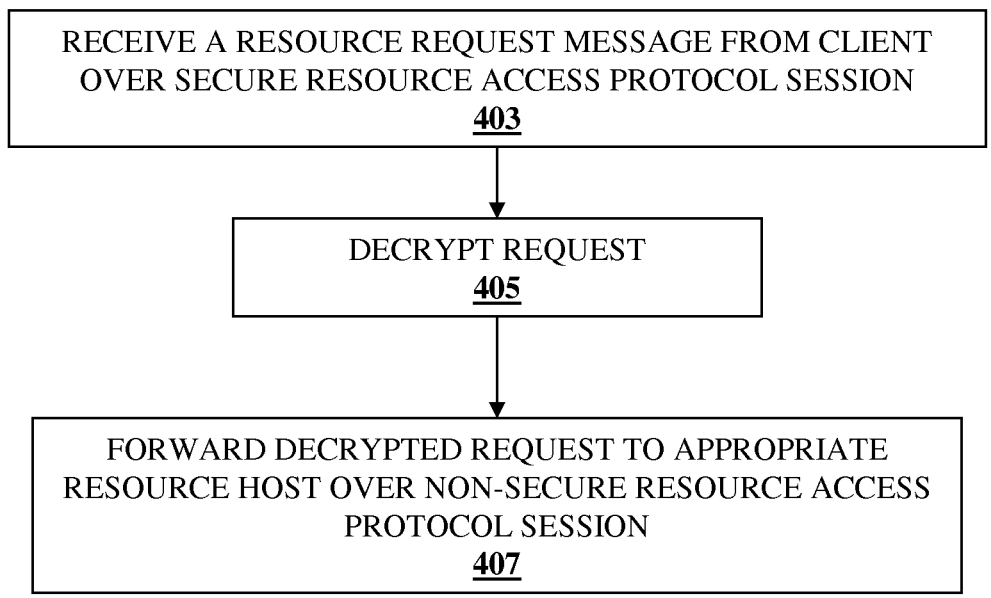
FIG. 4A is an exemplary flowchart for processing a request for redirect resource locator identifier rewrite according to one embodiment of the invention.
Figure 4B:
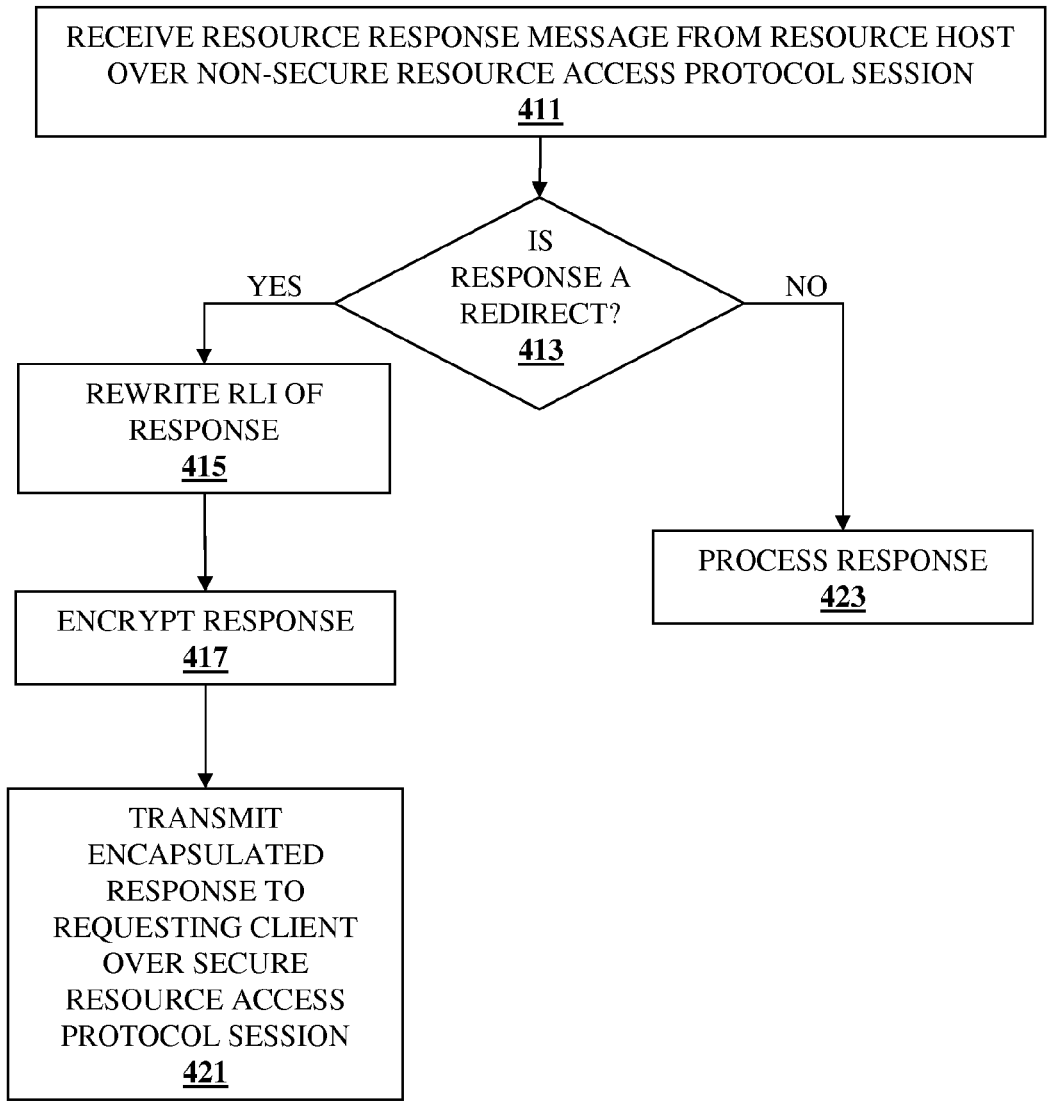
FIG. 4B is an exemplary flowchart for processing a resource response for redirect resource locator identifier rewrite according to one embodiment of the invention.

FIGS. 4A-4B are exemplary flowcharts for redirect resource locator identifier rewrite according to one embodiment of the invention. FIG. 4A is an exemplary flowchart for processing a request for redirect resource locator identifier rewrite according to one embodiment of the invention. At block 403, a resource request message from a client is received over a secure resource access protocol session. At block 405, the request is decrypted. At block 407, the decrypted request is forwarded to the appropriate resource host over a non-secure resource access protocol session.

FIG. 4B is an exemplary flowchart for processing a resource response for redirect resource locator identifier rewrite according to one embodiment of the invention. At block 411, a resource response is received from the resource host. At block 413, it is determined if the resource response is a redirect. For example, a HTTP response is a redirect response if the status in the header of the HTTP response begins with the number 3. A RLI rewrite network security proxy will scan the header of the response for the status field and determine if the status value is 3xx. If it is determined that the resource response is not a redirect, then control flows to block 423. If it is determined that the resource response is a redirect, then control flows to block 415.

At block 423, the resource response is processed (e.g., the response is encrypted, encapsulated, transmitted, etc.).

At block 415, a URL of the redirect resource response is rewritten. At block 417, the resource response is encrypted. At block 421, the resource response is transmitted to the requesting client over the secure resource access protocol session.

General Forward RLI Rewrite

The Header Forward RLI rewrite describes rewriting RLIs in the header of a message, but does not describe rewriting RLIs in the body of a message. The general forward RLI rewrite described in the following figures can be applied to rewrite RLIs in the body or in the header and body of a message. RLI rewrites made to the body of a message are relatively more complicated than RLI rewrites made to the header of a message because considerations are made for changing the size of the content in the body of a message. Various embodiments of the invention perform RLI rewrites to the body of a message differently, but two embodiments are described below. In one embodiment of the invention, general forward RLI rewrite is performed without persistent connection. In another embodiment of the invention, general forward RLI rewrite is performed with persistent connection. Although these two embodiments of the invention are illustrated with forward RLI rewrite, reverse RLI rewrite can also be performed with persistent connection and without persistent connection.

General Forward RLI Rewrite without Persistent Connections

Figure 5A:
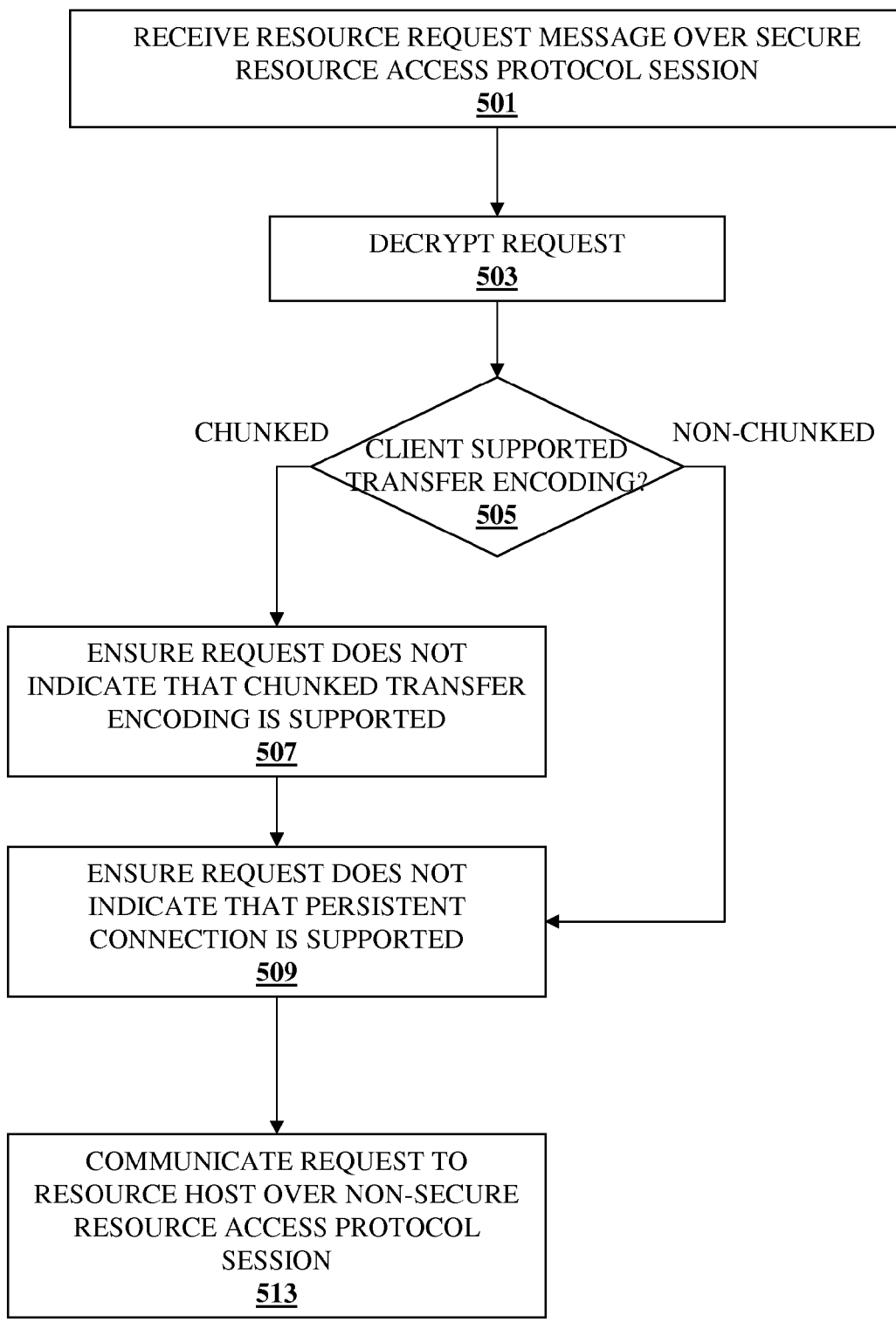
FIG. 5A is an exemplary flowchart for processing a request for general resource locator identifier rewrite without persistent connection according to one embodiment of the invention.
Figure 5B:
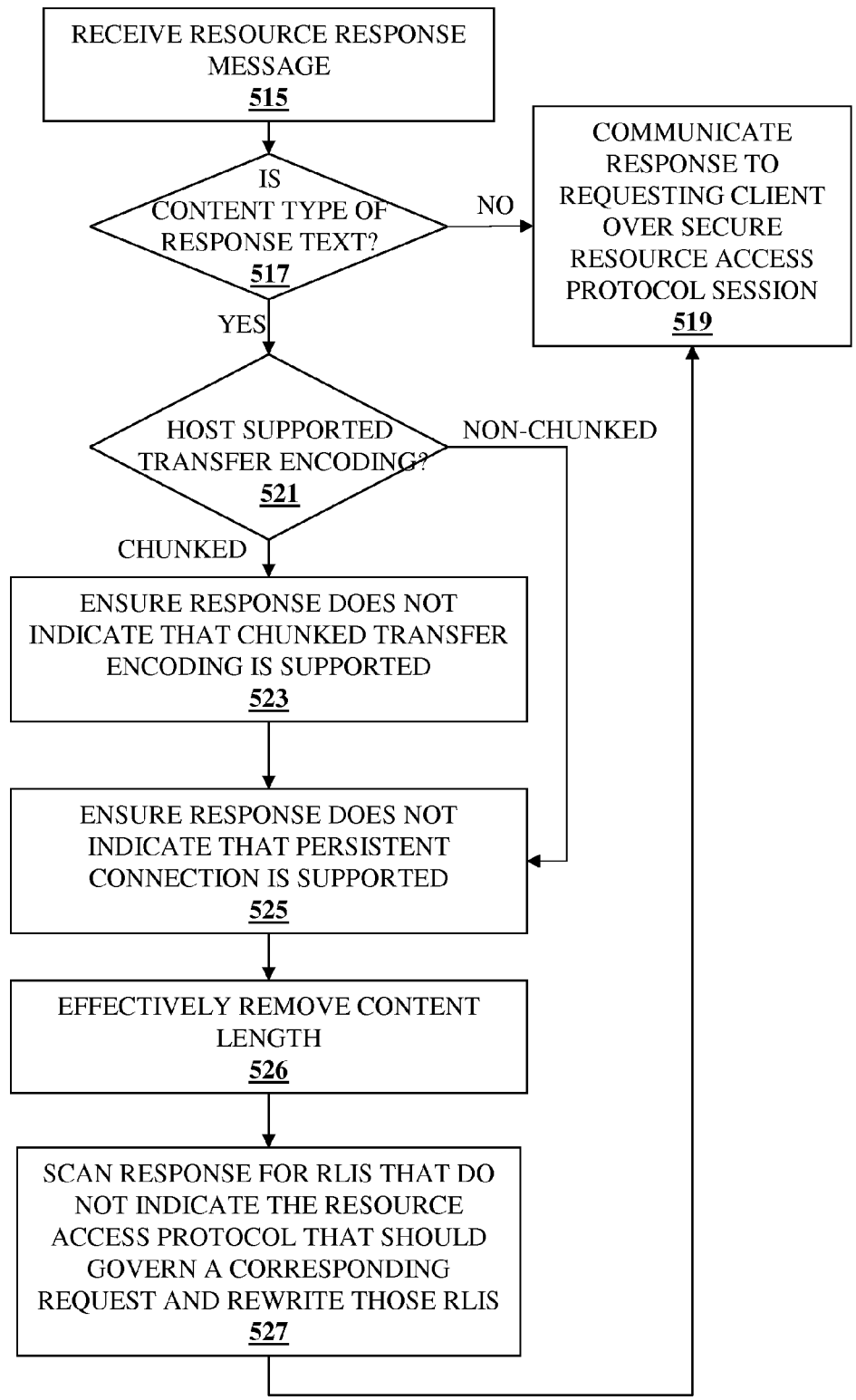
FIG. 5B is an exemplary flowchart for processing of a resource response for general resource locator identifier rewrite without persistent connection according to one embodiment of the invention.

FIGS. 5A-5B are exemplary flowcharts for general resource locator identifier rewrite without persistent connections according to one embodiment of the invention. FIG. 5A is an exemplary flowchart for processing a request for general resource locator identifier rewrite without persistent connection according to one embodiment of the invention. At block 501, a resource request message is received over a secure resource access protocol session. At block 503, the request is decrypted. At block 505, the type of transfer encoding indicated as supported by the requesting client is determined from the resource request message. If the request indicates that non-chunked transfer encoding is supported by the client, then control flows to block 509. If the resource request indicates that chunked transfer encoding is supported by the client, then control flows to block 507.

At block 507, it is ensured that the resource request does not indicate that chunked transfer encoding is supported (e.g., if the resource request is a HTTP request, then downgrading the version indicated in the request from 1.1 to 1.0). At block 509, it is ensured that the request does not indicate that persistent connection is supported. Again using HTTP as an example, indicating that persistent connection is not supported can be done by modifying the connection parameter in the header of the HTTP request from "Keep-Alive" to "close<5 spaces>" or appending "Connection: close" to the header. At block 513, the request is communicated to a resource host over a non-secure resource access protocol session.

FIG. 5B is an exemplary flowchart for processing of a resource response for general resource locator identifier rewrite without persistent connection according to one embodiment of the invention. At block 515, a response is received. At block 517, it is determined if the content type of the resource response is text. If the content type is text, then control flows to block 521. If the content type is not text (e.g., image, audio, multipart HTTP responses, etc.), then control flows to block 519. Skipping processing of responses with non-text content type increases efficiency and performance.

At block 519, the response is communicated to the requesting client over the secure resource access protocol session.

At block 521, the type of transfer encoding indicated as supported by the resource host is determined from the response. If the response indicates that non-chunked transfer encoding is supported, then control flows to block 525. If the resource response indicates that chunked transfer encoding is supported, then control flows to block 523.

At block 523, it is ensured that the response does not indicate that chunked transfer encoding is supported. At block 525, it is ensured that the response does not indicate that persistent connection is supported. At block 526, content length is effectively removed from the response. For example, if the resource request is a HTTP request then the header parameter "Content-Length: xxx" is modified to "Content_Length: xxx." As shown in the above example, the content length field "Content-Length: xxx" is effectively removed by replacing the hyphen in the label of the field with an underscore such that a client receiving the response is unable to recognize the content length field. As a result, the client is prevented from using the content length indicated in the response. At block 527, the response is scanned for RLIs that do not indicate an appropriate request governing resource access protocol, and those URLs are rewritten to indicate the appropriate request governing resource access protocol. For example, assume a RLI rewrite network security proxy, which is protecting resource hosts, has a rewrite configuration file with the following entries:

www.securehost.com
www.resourcehost.com
9.120.*.*

If the RLI rewrite network security proxy finds a RLI that identifies a resource host that matches one of the resource hosts in the rewrite configuration file and that does not indicate a secure resource access protocol (assuming the appropriate request governing resource access protocol is a secure resource access protocol), then the RLI rewrite network security proxy will rewrite that RLI to indicate the secure resource access protocol. Although the example assumes the alternative to the appropriate request governing resource access protocol is a non-secure resource access protocol, in alternative embodiments of the invention the appropriate request governing resource access protocol is a particular secure resource access protocol. In such an embodiment, a RLI may indicate a secure resource access protocol, but be rewritten because it is not the particular secure resource access protocol that is desired. In such an embodiment, the appropriate request governing resource access protocol is defined in the configuration file and not assumed as in the above example that does not indicate any resource access protocol and relies on a default appropriate request governing resource access protocol.

Control flows from block 527 to block 519.

Since the size of a response will probably change due to resource locator identifier rewrite, the size of the response will be incorrect unless recomputed by the resources access protocol match assurance proxy or the client. Modifying messages to indicate that persistent connection is not supported (or disabled) and causing the header field "Content-Length" to effectively disappear forces the client to rely on close of the session to compute the length of the response it receives.

General Forward RLI Rewrite with Persistent Connection

Figure 6A:
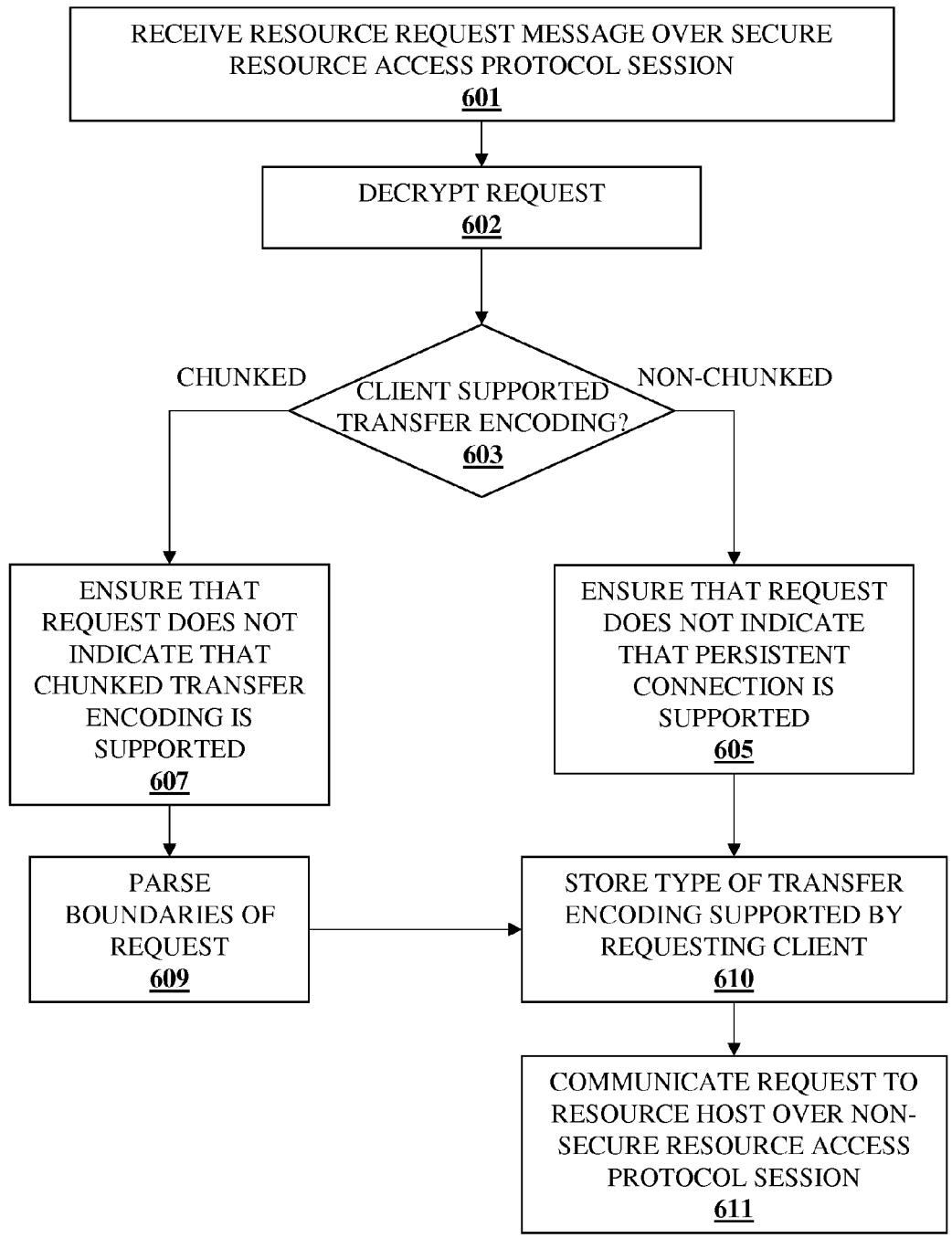
FIG. 6A is an exemplary flowchart for processing a resource request for general resource locator identifier rewrite with persistent connection according to one embodiment of the invention.
Figure 6B:
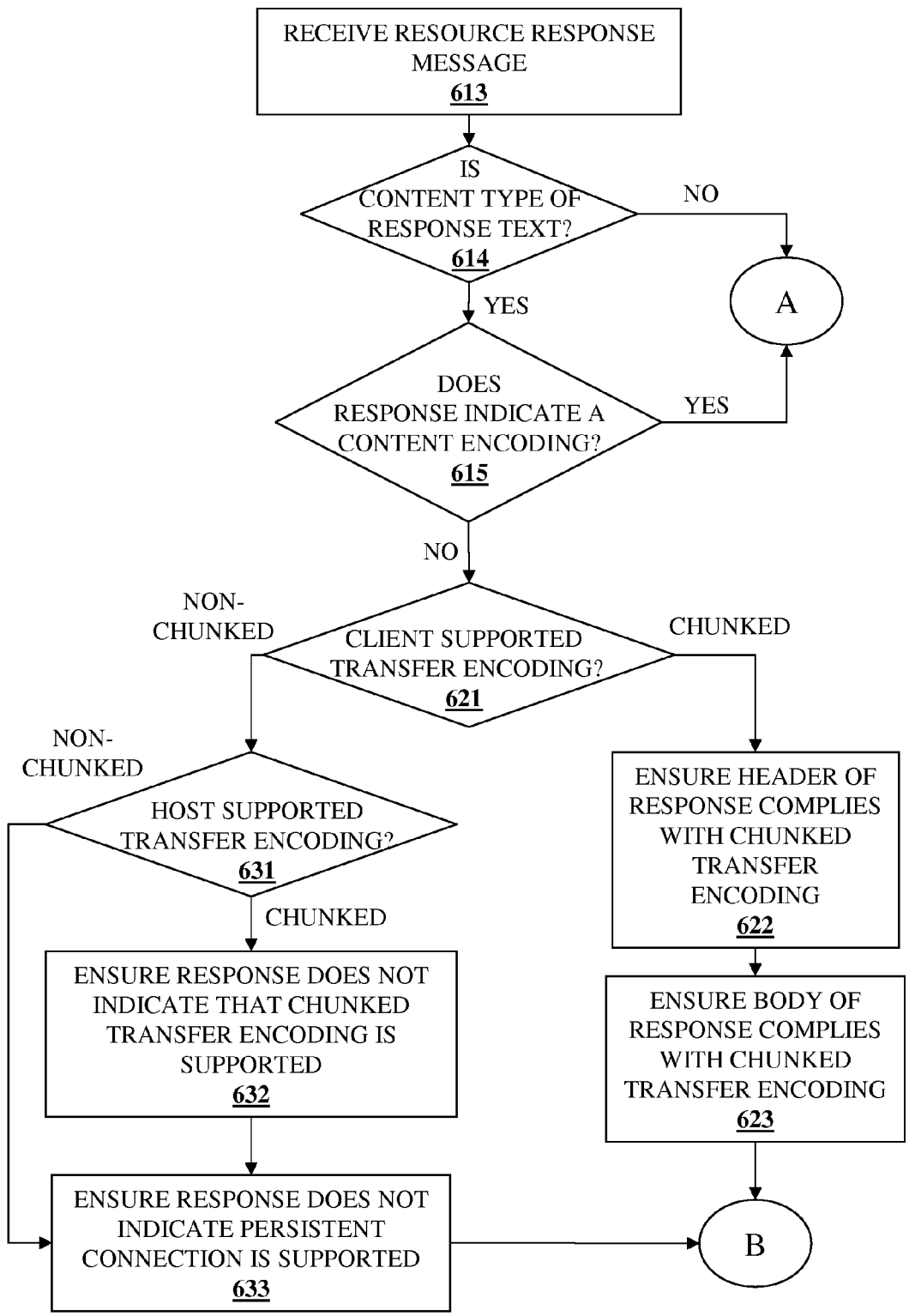
FIG. 6B is an exemplary flowchart for processing a resource response for general resource locator identifier rewrite with persistent connection according to one embodiment of the invention.
Figure 6C:
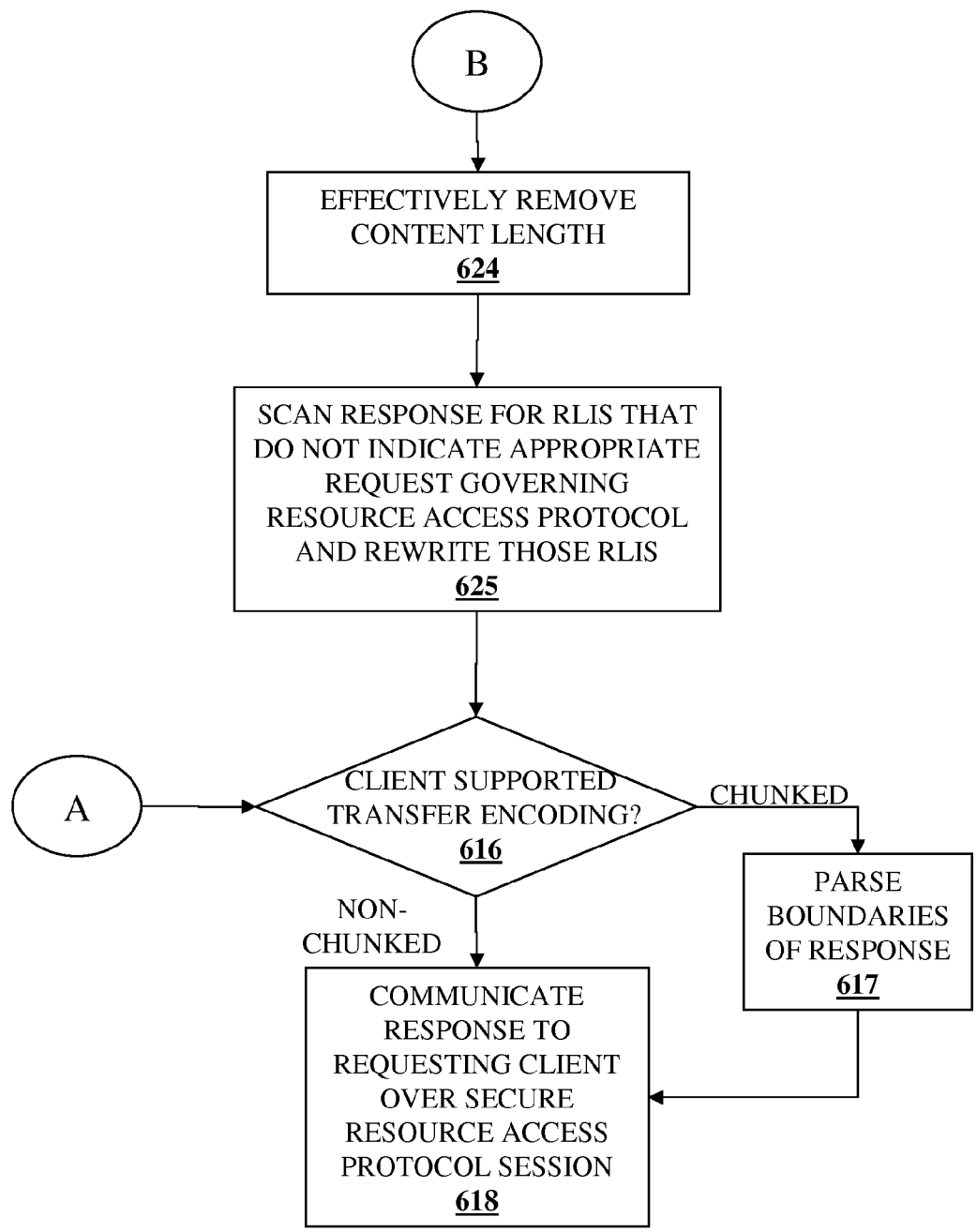
FIG. 6C is an exemplary flowchart continuing from FIG. 6B according to one embodiment of the invention.

FIGS. 6A-6C are exemplary flowcharts for general resource locator identifier rewrite with persistent connection according to one embodiment of the invention. FIG. 6A is an exemplary flowchart for processing a resource request for general resource locator identifier rewrite with persistent connection according to one embodiment of the invention. At block 601, a resource request message is received over a secure resource access protocol session. At block 602, the request is decrypted. At block 603, the type of transfer encoding indicated as supported by the client is determined from the resource request message. If the resource request indicates support of non-chunked transfer encoding, then control flows to block 605. If the resource request indicates support of chunked transfer encoding, then control flows block 607.

At block 607, it is ensured that the request does not indicate that chunked transfer encoding is supported. At block 609, the boundaries of the request are parsed. Control flows from block 609 to block 610.

At block 605, it is ensured that the request does not indicate that persistent connection is supported. At block 610, the type of transfer encoding indicated as supported by the requesting client is stored. At block 611, the request is communicated to the appropriate resource host over a non-secure resource access protocol session.

FIG. 6B is an exemplary flowchart for processing a resource response for general resource locator identifier rewrite with persistent connection according to one embodiment of the invention. At block 613, a response is received. At block 614, it is determined if the content type of the resource response is text. If the content type of the resource response is text, then control flows to block 615. If the content type of the resource response is not text, then control flows to block 616 of FIG. 6C.

At block 615, it is determined if the response indicates a content encoding. If the response does indicate a content encoding, then control flows to block 616 of FIG. 6C. If the response does not indicate a content encoding, then control flows to block 621.

At block 621, the type of transfer encoding supported by the client is determined. This information was previously stored at block 610 of FIG. 6A. If the client supports chunked transfer encoding, then control flows to block 622. If the client supports non-chunked transfer encoding, then control flows to block 631.

At block 622, it is ensured that header of the response complies with chunked transfer encoding. At block 623, it is ensured that the body of the response complies with chunked transfer encoding. Control flows from block 623 to block 624 of FIG. 6C.

At block 631, the type of transfer encoding supported by the resource host is determined from the response. If the resource host supports chunked transfer encoding, then control flows to block 632. If the resource host supports non-chunked transfer encoding then control flows to block 633.

At block 632, it is ensured that the response does not indicate that chunked transfer encoding is supported. At block 633, it is ensured that the response does not indicate that persistent connection is supported. Control flows from block 633 to block 624 of FIG. 6C.

FIG. 6C is an exemplary flowchart continuing from FIG. 6B according to one embodiment of the invention. At block 616, the type of transfer encoding indicated as supported by the client is determined. If the client supports chunked transfer encoding, then control flows to block 617. If the client supports non-chunked transfer encoding, then control flows to block 618.

At block 617, the boundaries of the response are parsed. At block 618, the response is communicated to the requesting client over a secure resource access protocol session.

At block 624, the content length is effectively removed from the response. At block 625, the response is scanned for RLIs that do not indicate an appropriate governing resource access protocol for that particular RLI, and those RLIs are rewritten. Control flows from block 625 to block 616.

Not disabling persistent connection as described in FIGS. 6A-6C allows the client to utilize chunked transfer encoding for requests while avoiding receiving chunked transfer encoded responses from the resource host. The client and the RLI rewrite network security proxy can take advantage of the features of persistent connection without encountering problems of erroneous length values in the header of responses.

Header forward resource locator identifier rewrite and general forward resource locator identifier rewrite can be implemented independently, in combination, etc. An entity may only wish to employ resource locator identifier rewrite for redirect scenarios. Another entity may wish to employ resource locator identifier rewrite for all scenarios. With general forward resource locator identifier rewrite, the option is also available to maintain persistent connection features provided by HTTP 1.1. Furthermore, the owner of a network security device may wish to employ general forward resource locator identifier rewrite for all scenarios, or header forward resource locator identifier rewrite for redirect scenarios and general forward resource locator identifier rewrite for non-redirect scenarios.

Exemplary Forward RLI Rewrite Architectures

Various architectures can be used to implement forward RLI rewrite (be it redirect and/or general; be it persistent or non-persistent). By way of illustrations, two such architecture are described below. While two such architectures are described, it should be understood that the invention is not limited to these two exemplary architectures.

Figure 7A:
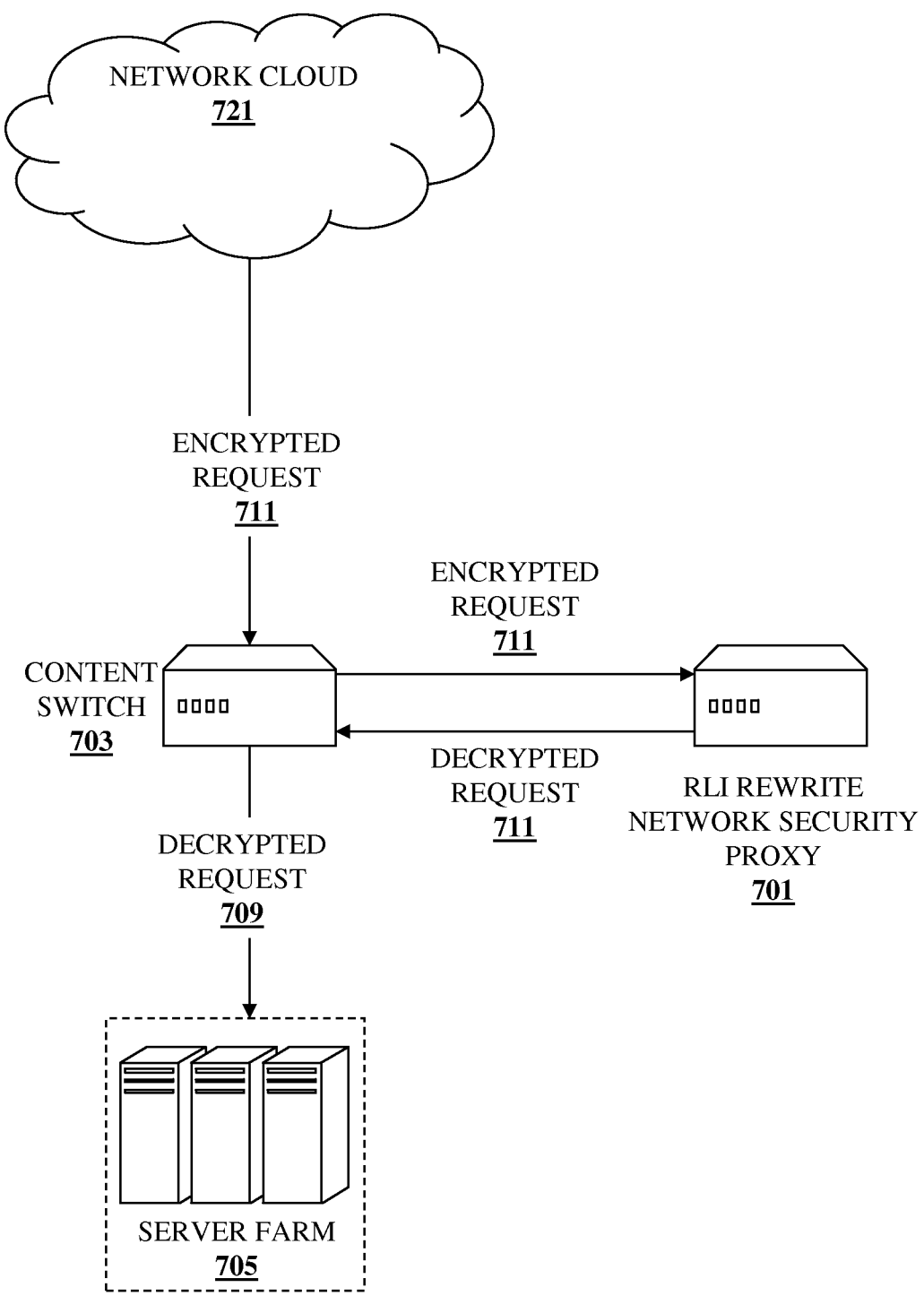
FIG. 7A is an exemplary diagram illustrating processing of a request in one port mode for resource locator identifier rewrite according to one embodiment of the invention.
Figure 7B:
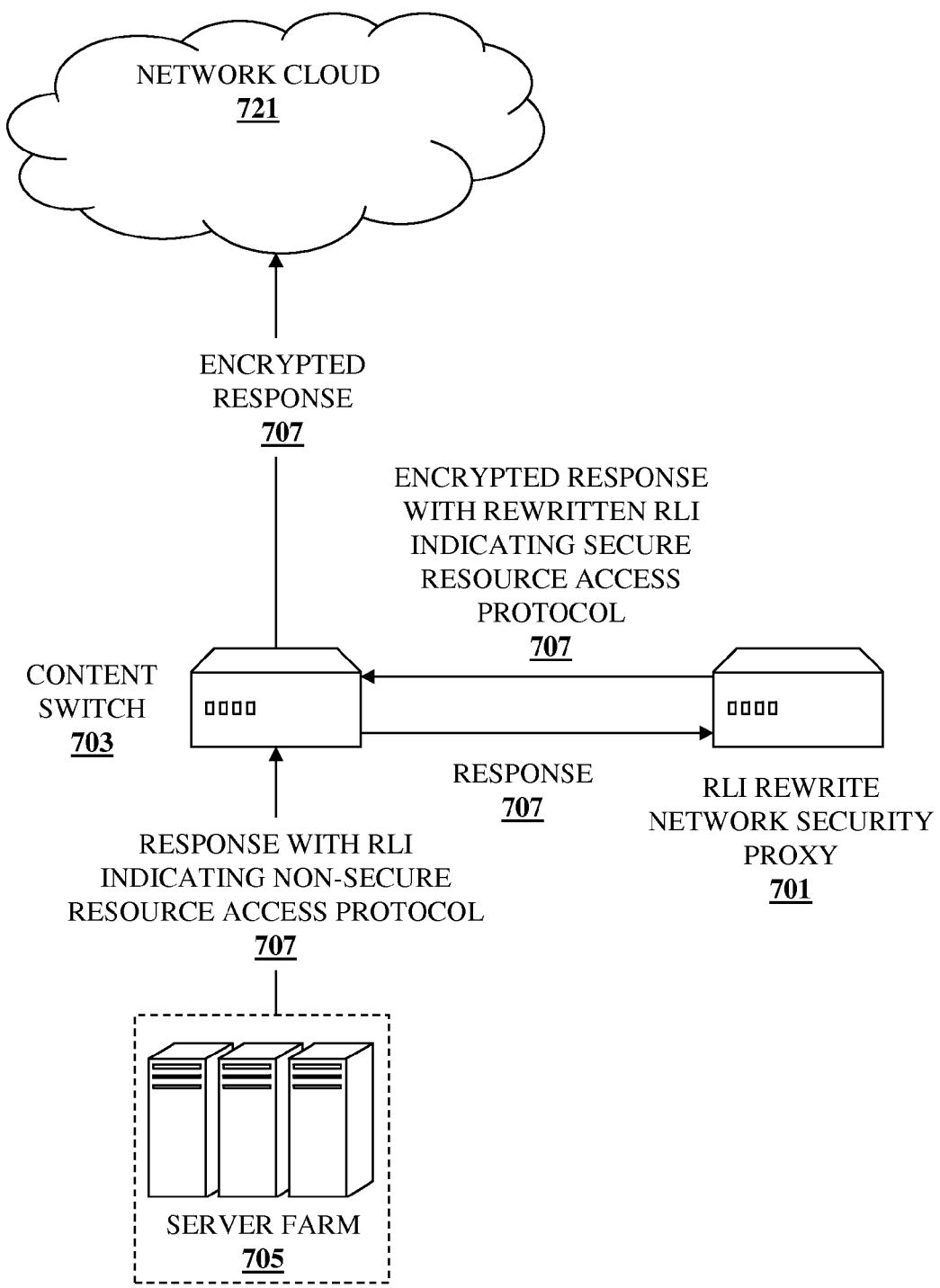
FIG. 7B is an exemplary diagram illustrating processing of a response in one port mode for resource locator identifier rewrite according to one embodiment of the invention.

FIGS. 7A-7B are diagrams illustrating an exemplary one port mode architecture according to one embodiment of the invention. FIG. 7A is an exemplary diagram illustrating processing of a request in one port mode for resource locator identifier rewrite according to one embodiment of the invention. In FIG. 7A, a content switch 703 receives an encrypted request 711 from a network cloud 721. The encrypted request 711 may have been transmitted directly from a requesting client, from an intermediary network security device protecting the actual requesting client, etc. The content switch 703 resolves the encrypted request 711 to a rule that indicates secure messages should be passed to a RLI rewrite network security proxy 701. The proxy 701 decrypts the request 711 and forwards the decrypted request 711 back to the content switch 703. The content switch 703 then forwards the decrypted request 711 to the appropriate resource host within a server farm 705.

FIG. 7B is an exemplary diagram illustrating processing of a response in one port mode for resource locator identifier rewrite according to one embodiment of the invention. In FIG. 7B, the appropriate resource host within the server farm 705 transmits to the content switch 703 a response 707 having a RLI that indicates a non-secure resource access protocol. The content switch 703 passes the response 707 to the proxy 701. The proxy 701 rewrites the RLI to indicate a secure resource access protocol and encrypts the response 707. The proxy 701 forwards the encrypted response 707 with the rewritten RLI to the content switch 703. The content switch 703 transmits the response 707 through the network cloud 721 to the requesting client.

Figure 8A:
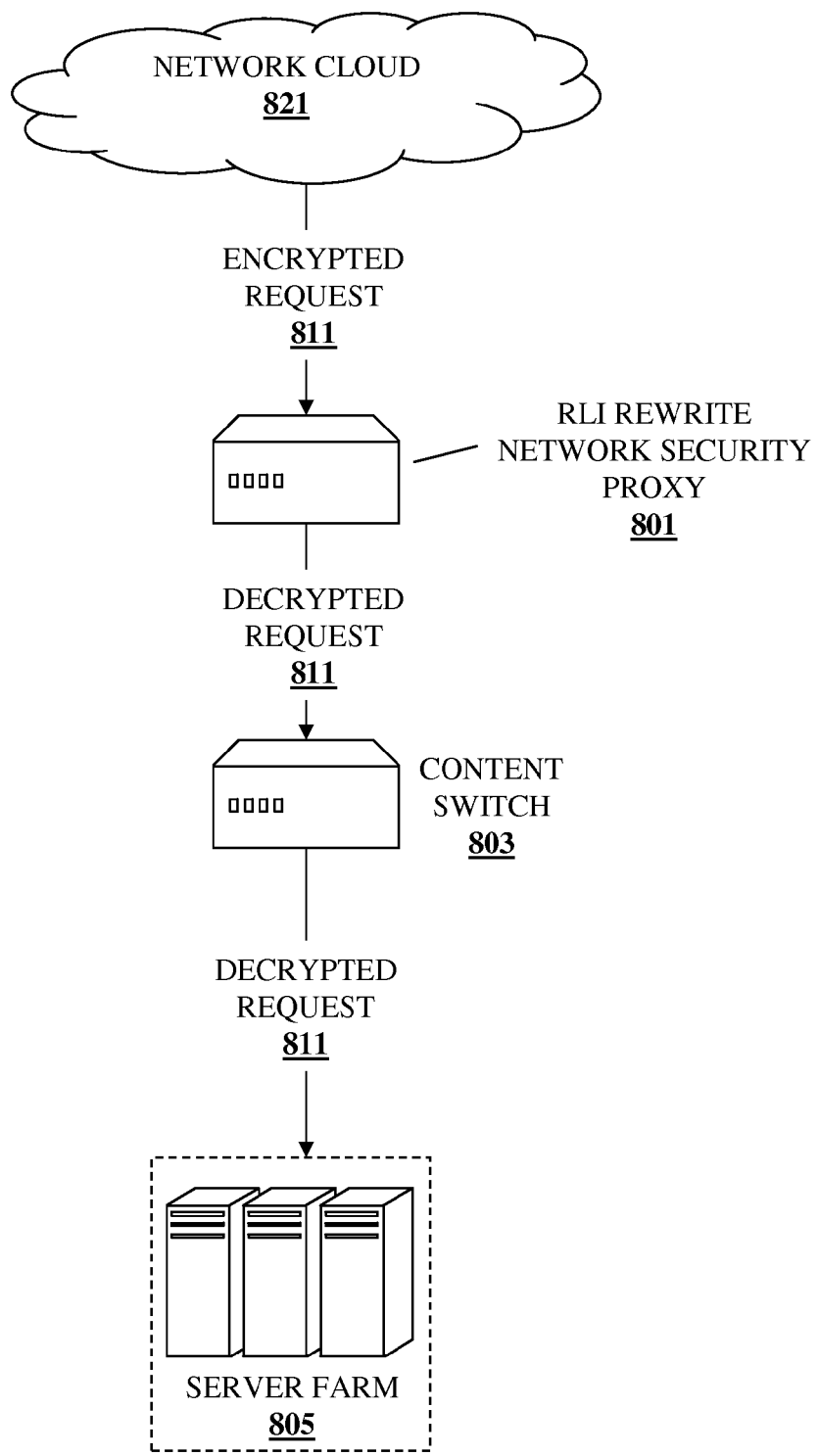
FIG. 8A is an exemplary diagram illustrating processing of a request in in-line mode for resource locator identifier rewrite according to one embodiment of the invention.
Figure 8B:
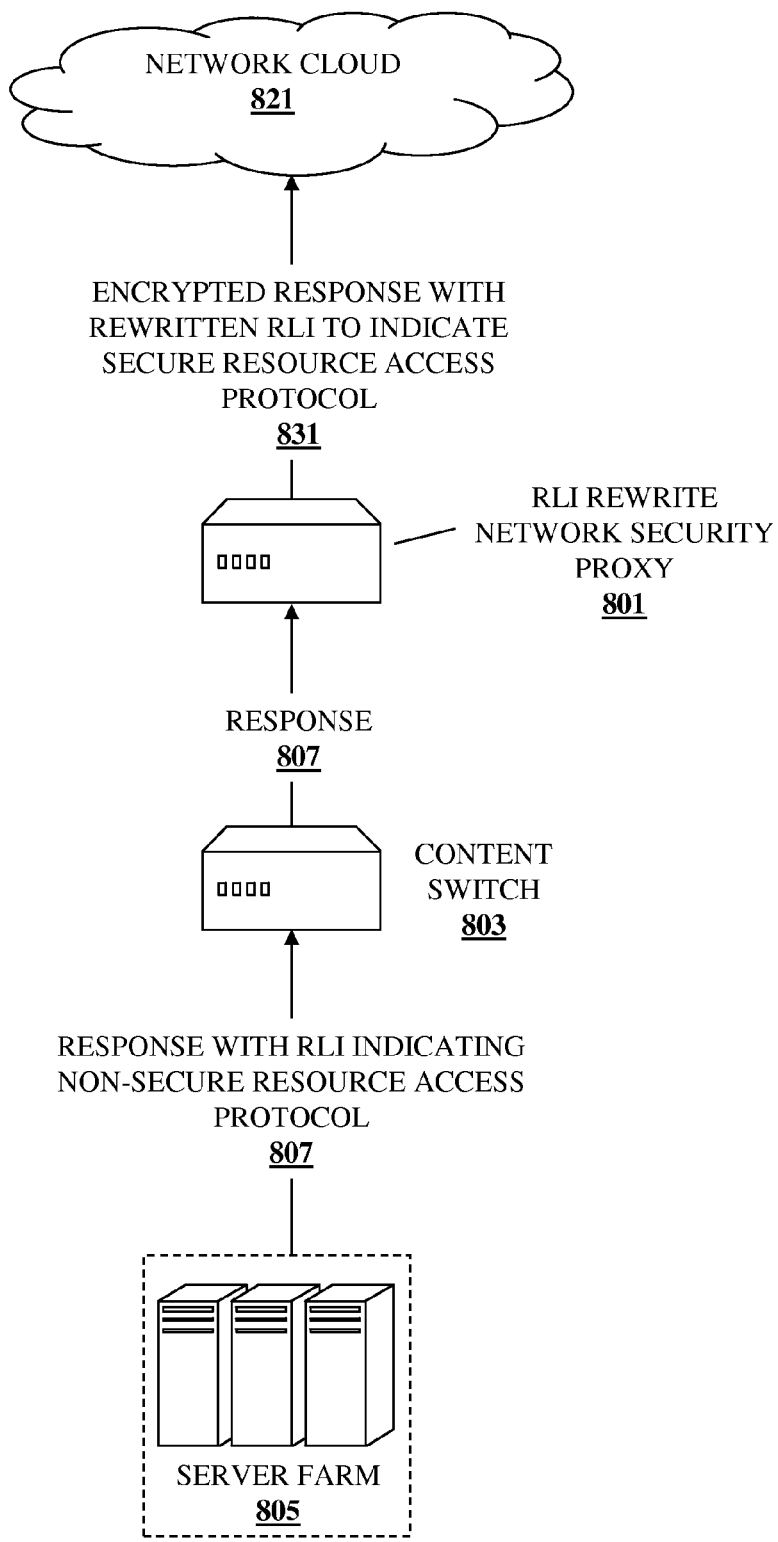
FIG. 8B is an exemplary diagram illustrating processing of a response in in-line mode for resource locator identifier rewrite according to one embodiment of the invention.

FIGS. 8A-8B are diagrams illustrating an exemplary in-line mode architecture according to one embodiment of the invention. FIG. 8A is an exemplary diagram illustrating processing of a request in in-line mode for resource locator identifier rewrite according to one embodiment of the invention. In FIG. 8A, a RLI rewrite network security proxy 801 receives an encrypted request 811 from a network cloud 821. As in FIG. 7A, the encrypted request 811 may have been transmitted directly from a requesting client, from an intermediary network security device protecting the requesting client, etc. The proxy 801 decrypts the request 811 and forwards the decrypted request 811 to a content switch 803. The content switch 803 determines the appropriate resource host within a server farm 805 and transmits the decrypted request 811 to that resource host.

FIG. 8B is an exemplary diagram illustrating processing of a response in in-line mode for resource locator identifier rewrite according to one embodiment of the invention. In FIG. 8B, the appropriate resource host within the server farm 805 transmits to the content switch 803 a response 807 having a RLI that indicates a non-secure resource access protocol. The content switch 803 passes the response 807 to the proxy 801. The proxy 801 rewrites the RLI in the response 807 to indicate a secure resource access protocol and encrypts the response 807. The proxy 801 transmits the encrypted response 807 with the rewritten RLI to the requesting client via the network cloud 821.

While two exemplary architectures have been described, it is understood that other architectures are within the scope of the invention.

Reverse RLI Rewrite

As with forward RLI rewrite, reverse RLI rewrite can be performed on RLIs in the header of a message and/or in the body of a message.

Header Reverse RLI Rewrite

Figure 9A:
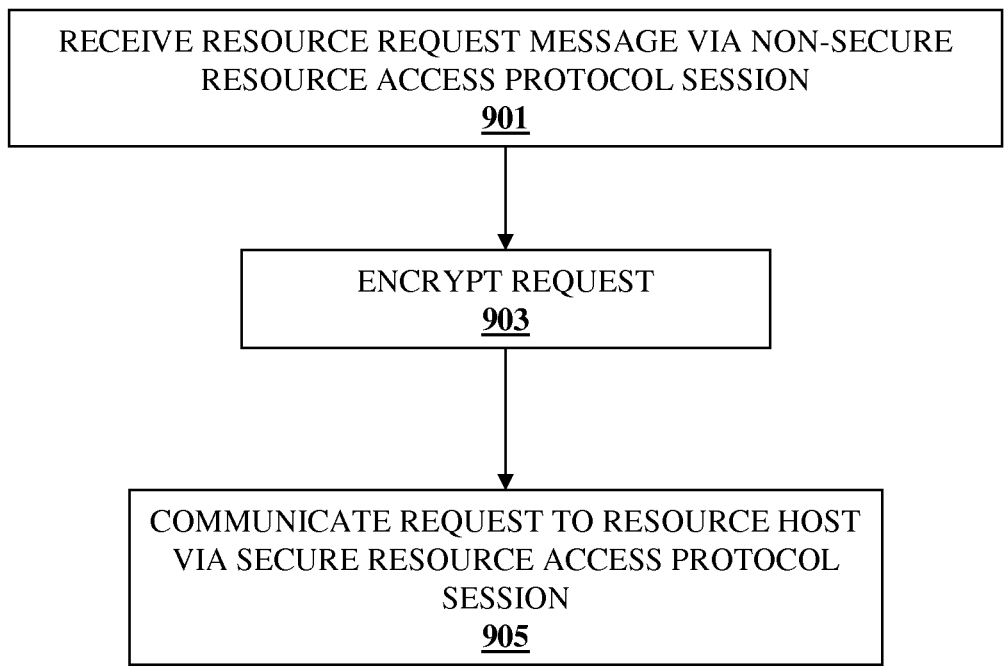
FIG. 9A is an exemplary flowchart for processing a request for reverse RLI rewrite according to one embodiment of the invention.
Figure 9B:
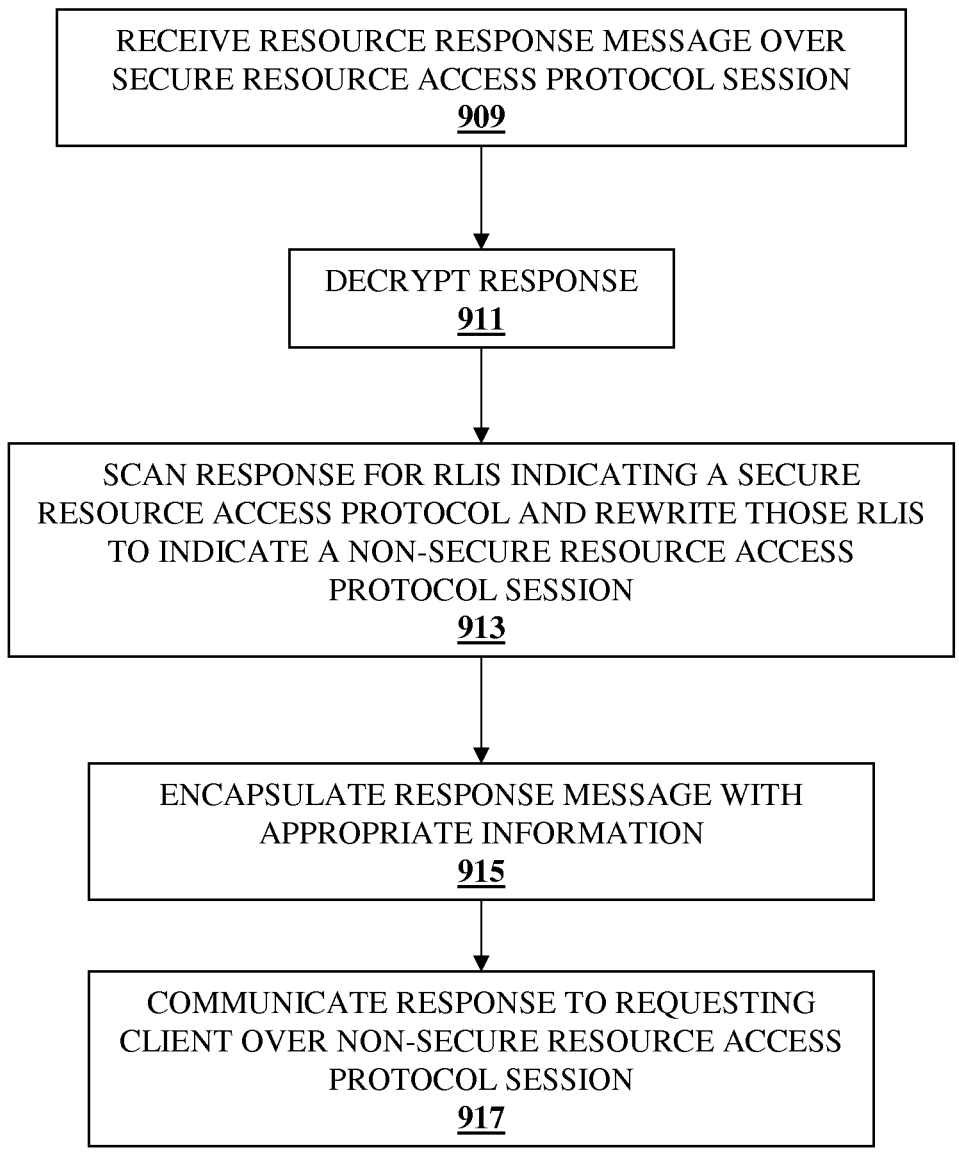
FIG. 9B is an exemplary flowchart for processing a response for reverse RLI rewrite according to one embodiment of the invention.

Performing header reverse RLI rewrite is similar to performing header forward RLI rewrite as described in FIGS. 4A-4B. FIGS. 9A-9B are exemplary flowcharts for performing header reverse RLI rewrite according to one embodiment of the invention.

FIG. 9A is an exemplary flowchart for processing a request for reverse RLI rewrite according to one embodiment of the invention. At block 901, a resource request message is received via a non-secure resource access protocol session. At block 903, the request is encrypted. At block 905, the request is communicated to a resource host via a secure resource access protocol session.

FIG. 9B is an exemplary flowchart for processing a response for reverse RLI rewrite according to one embodiment of the invention. At block 909, a resource response message is received over a secure resource access protocol session. At block 911, the response is decrypted. At block 913, the response is scanned for RLIs that indicate a secure resource access protocol session and those RLIs are rewritten to indicate a non-secure resource access protocol. At block 915, the response (or fragments of the response) is encapsulated with the appropriate information. At block 917, the decrypted response is communicated to the requesting client over a non-secure resource access protocol session.

General Reverse RLI Rewrite

When performing reverse RLI rewrite on the body of a message, reverse RLI rewrite can be performed without persistent connection or with persistent connection, similar to forward RLI rewrite as described above in FIGS. 5A-5B and FIGS. 6A-6B. For general reverse RLI rewrite, at block 501 of FIG. 5A and block 601 of FIG. 6A, the secure resource access protocol session would be a non-secure resource access protocol session and at block 513 of FIG. 5A and block 611 of FIG. 6A, the non-secure resource access protocol session would be a secure resource access protocol session. In addition, when the request is communicated to the resource host as described in block 513 of FIG. 5A and block 611 of FIG. 6A, the request would be encrypted instead of decrypted. In FIGS. 5B and 6B, the response would be decrypted for general reverse RLI rewrite after blocks 515 and 613. At block 519 of FIG. 5B and block 618 of FIG. 6B, the decrypted resource response would be transmitted over a non-secure resource access protocol session to the requesting client for general reverse RLI rewrite instead of a secure resource access protocol session.

As previously stated with respect to forward RLI rewrite, header reverse resource locator identifier rewrite and general reverse resource locator identifier rewrite can be implemented independently, in combination, etc. An entity may only wish to employ resource locator identifier rewrite for redirect scenarios. Another entity may wish to employ resource locator identifier rewrite for all scenarios. With general reverse resource locator identifier rewrite, the option is also available to maintain persistent connection features provided by HTTP 1.1. Furthermore, the owner of a network security device may wish to employ general reverse resource locator identifier rewrite for all scenarios, or header reverse resource locator identifier rewrite for redirect scenarios and general resource reverse locator identifier rewrite for non-redirect scenarios.

Exemplary Reverse RLI Rewrite Architecture

Figure 10A:
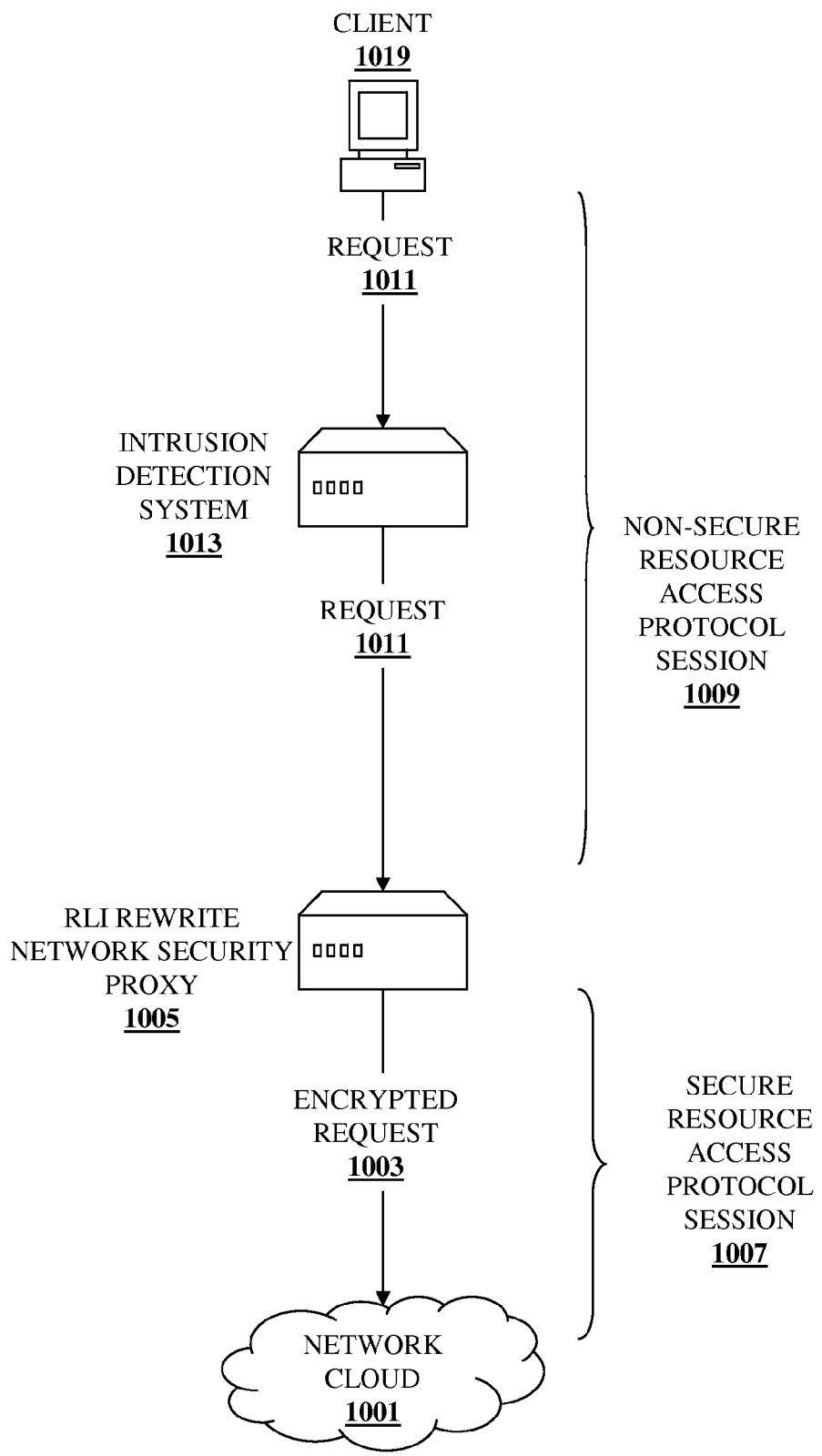
FIG. 10A is an exemplary diagram illustrating a reverse RLI rewrite architecture sending a request according to one embodiment of the invention.
Figure 10B:
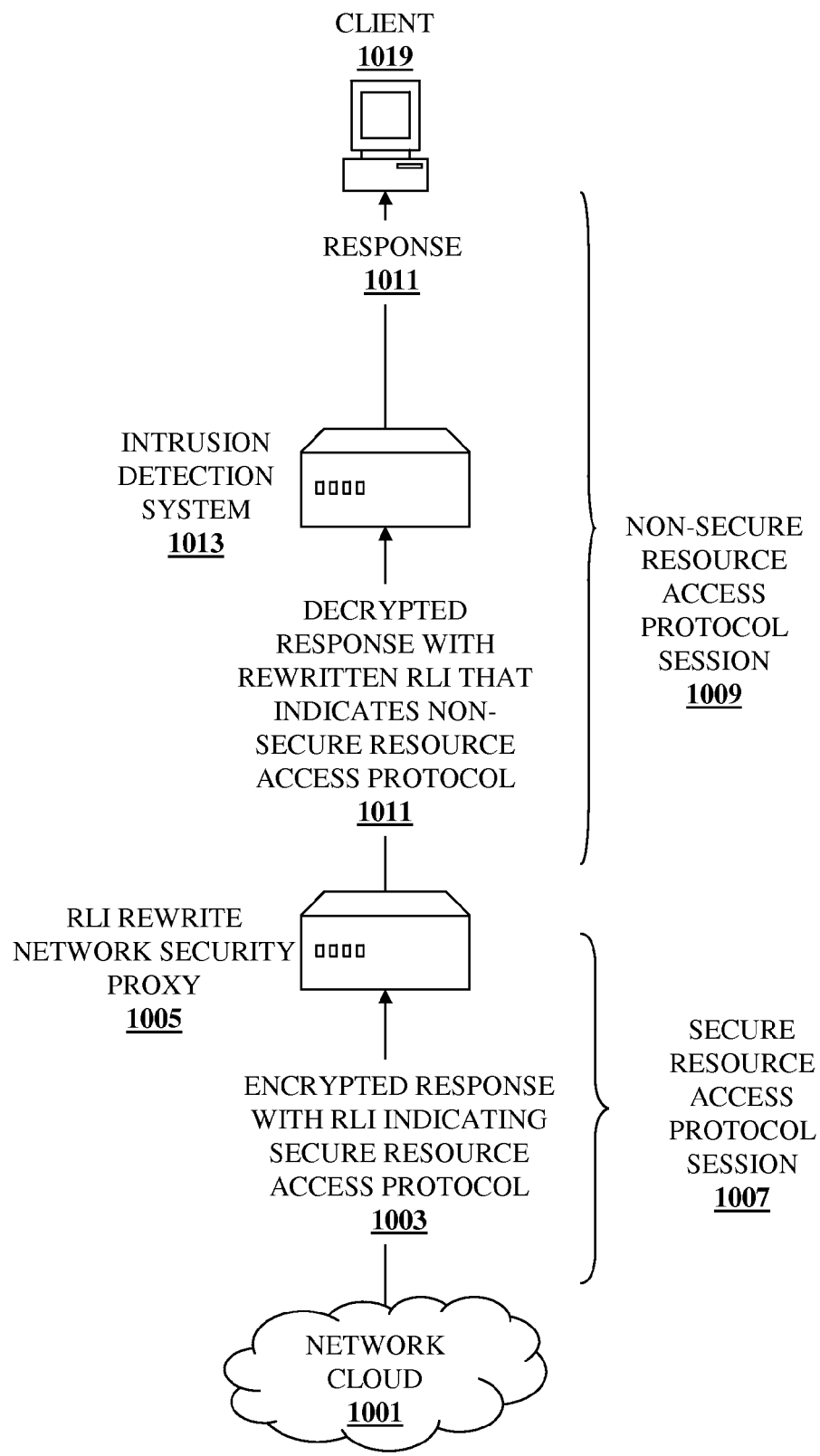
FIG. 10B is an exemplary diagram illustrating a reverse RLI rewrite architecture receiving a response according to one embodiment of the invention.

FIGS. 10A-10B are diagrams illustrating an exemplary reverse RLI rewrite architecture according to one embodiment of the invention. FIG. 10A is an exemplary diagram illustrating a reverse RLI rewrite architecture sending a request according to one embodiment of the invention. In FIG. 10A, a client 1019 is protected by an intrusion detection system (IDS) 1013 and a RLI rewrite network security proxy system 1005. The client 1019 is coupled with the IDS 1013. The IDS 1013 is coupled with the proxy 1005. A non-secure resource access protocol session 1009 is established between the client 1019 and the proxy 1005. The proxy 1005 has established a secure resource access protocol session 1007 with an external network element (e.g., a resource host in a different local area network) via a network cloud 1001.

The client 1019 transmits a request 1011 to the proxy 1005. As the request passes through the IDS 1013, the IDS 1013 analyzes the request. In an alternative embodiment of the invention, data does not pass through an IDS, but a security network device, such as an IDS, sniffs the line between the client 1019 and the proxy 1005. The proxy 1005 encrypts the request 1011 and transmits it to the network cloud 1001.

FIG. 10B is an exemplary diagram illustrating a reverse RLI rewrite architecture receiving a response according to one embodiment of the invention. The proxy 1005 receives an encrypted response 1003 that has a RLI indicating a secure resource access protocol. The proxy 1005 decrypts the response 1003 and rewrites the RLI in the response 1003 to indicate a non-secure resource access protocol. The proxy 1005 forwards the decrypted response 1011 with the rewritten RLI to the client 1019 through the IDS 1013. The IDS 1013 can analyze the response 1011 since it is decrypted. Since the RLI does not indicate a secure resource access protocol, a request for the resource of that RLI from the client 1019 will not be encrypted and can be sniffed or analyzed by the IDS 1013.

Reverse resource locator identifier rewrite enables message exchange without bypassing security measures or hindering network security devices with support of encryption operations, such as an intrusion detection system. In the example illustrated in FIGS. 10A-10B, the intrusion detection system 1013 can continue to analyze data transmitted between the client 1019 and the proxy 1005 without being saddled with decryption duties since they are performed by the proxy 1005.

Combination of Forward and Reverse RLI Rewrite

It should be understood that both forward and reverse RLI rewrite can be implemented separately or in various combinations. A RLI rewrite network security proxy that performs forward RLI rewrite can communicate with a client, a network security device that does not perform RLI rewrite, a network security device that performs reverse RLI rewrite, etc. A RLI rewrite network security proxy that performs reverse RLI rewrite can communicate with a network security device that does not perform RLI rewrite, a network security device that performs forward RLI rewrite, a resource host, etc. The benefits provided separately by forward and reverse RLI rewrite can all be realized in a scenario where a RLI rewrite network security proxy that performs forward RLI rewrite exchanges messages with a RLI rewrite network security proxy that performs reverse RLI rewrite.

Moreover, a local area network may include clients and resource hosts. In such a scenario, forward and reverse RLI rewrite can be respectively performed in the LAN by separate intermediary network security devices; alternatively, a single intermediary network security device can perform both forward and reverse RLI rewrite. In one scenario, a RLI rewrite network security proxy that performs both forward and reverse RLI rewrite exchanges messages with another RLI rewrite network security proxy that also performs both forward and reverse RLI rewrite.

Exemplary Processing of Resource Messages

The RLI rewrite network security proxies illustrated in the Figures above include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Figure 11A:
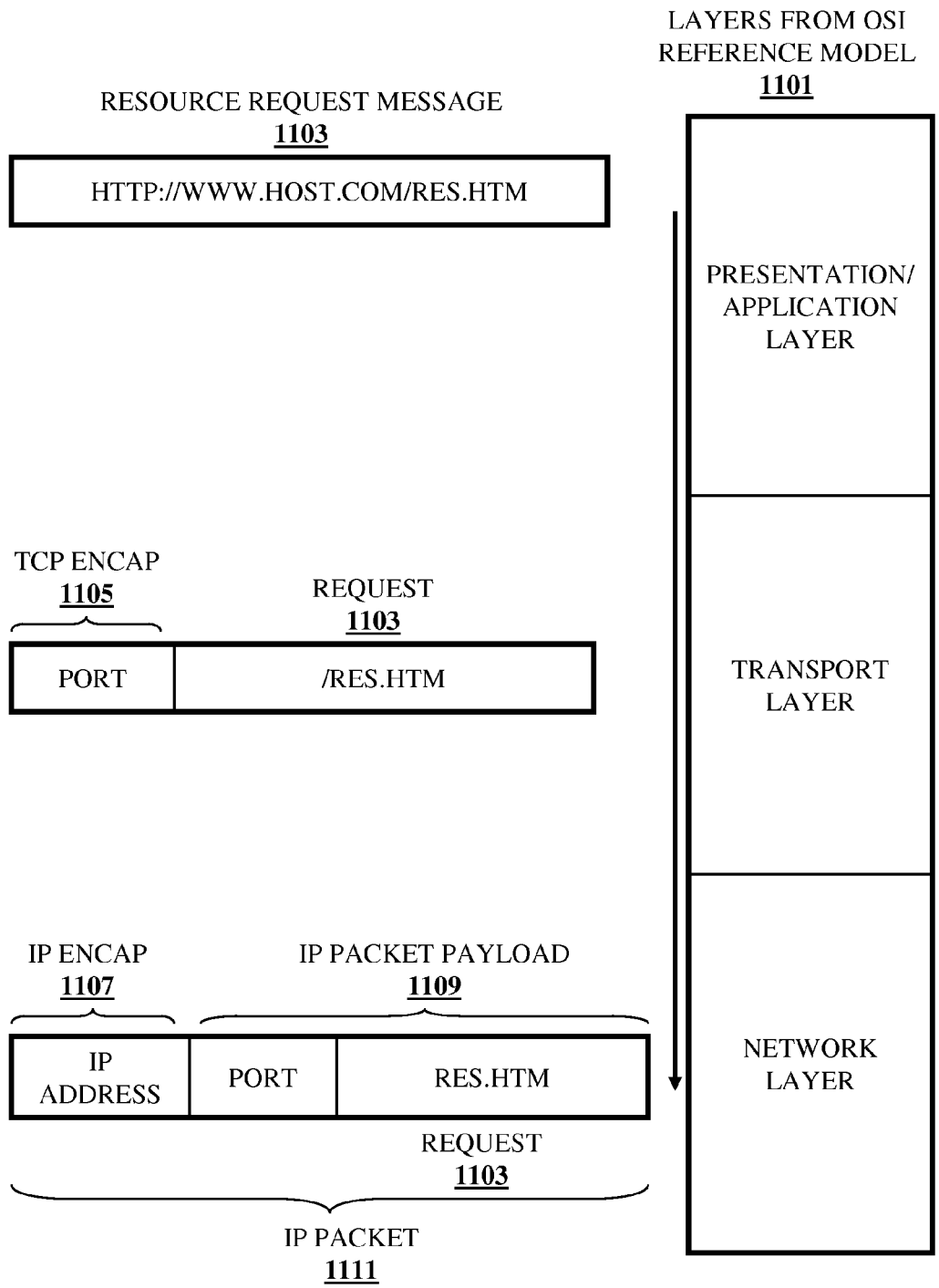
FIG. 11A is a conceptual diagram illustrating exemplary processing of a request with reference to layers from the OSI reference model according to one embodiment of the invention.
Figure 11B:
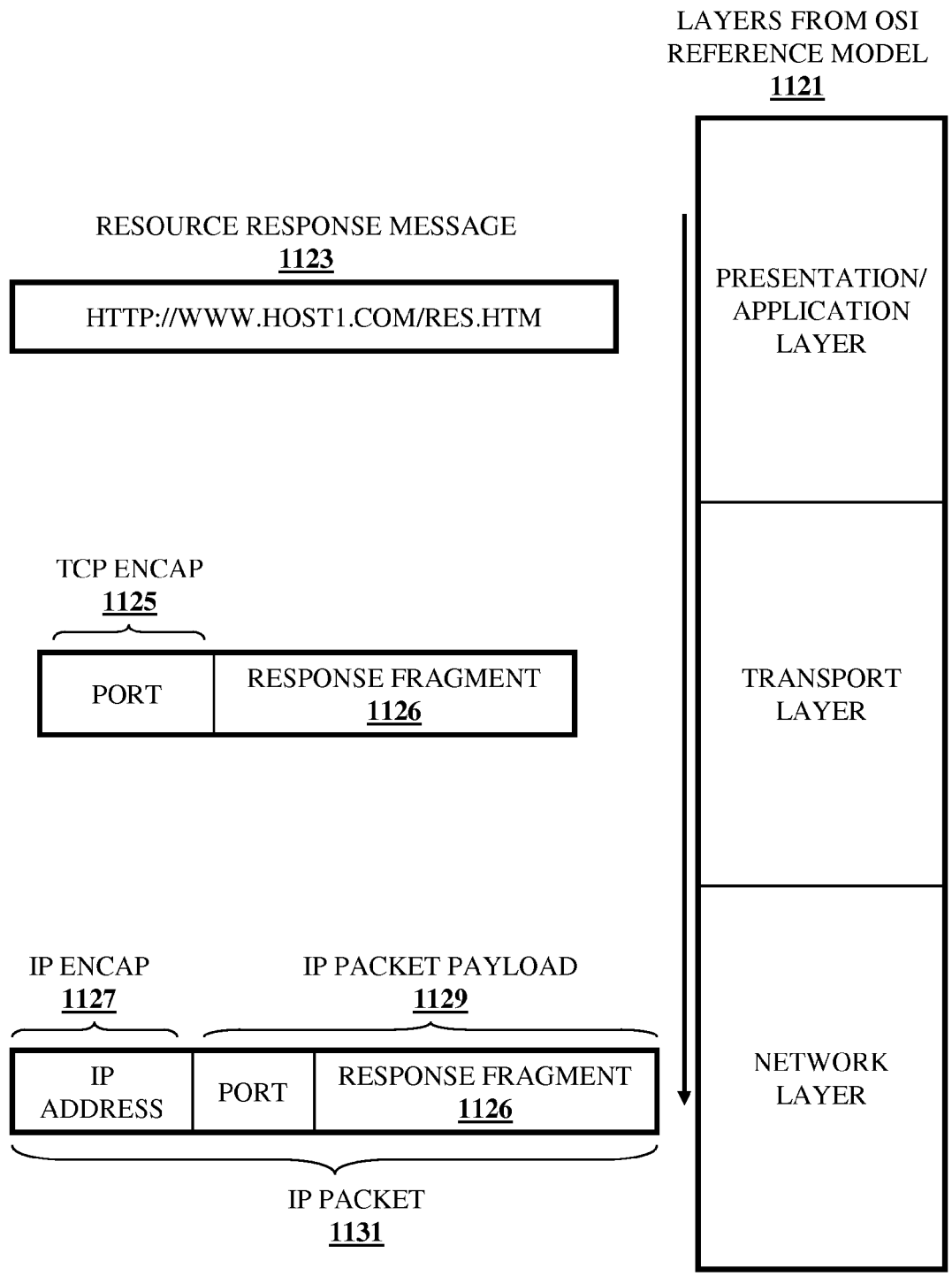
FIG. 11B is a conceptual diagram illustrating exemplary processing of a response with reference to layers from the OSI reference model according to one embodiment of the invention.

FIGS. 11A-11B are conceptual diagrams illustrating exemplary processing of a resource message with reference to layers from the OSI reference model according to one embodiment of the invention. The processing illustrated in FIGS. 11A-11B is an example of the message processing performed for any RLI rewrite (i.e., reverse RLI rewrite, general forward RLI rewrite, redirect forward RLI rewrite, etc.). FIG. 11A is a conceptual diagram illustrating exemplary processing of a request with reference to layers from the OSI reference model according to one embodiment of the invention. In FIGS. 11A-11B, only certain layers from the OSI reference model are illustrated in a multilayer block 1101. The block 1101 includes, from bottom to top, the network layer, the transport layer, and the application/presentation layer. A request 1103 is illustrated next to the application/presentation layer.

As the request 1103 is successively processed down the model at each layer, the request 1103 is modified and/or information is added and/or removed from the request 1103. At the application/presentation layer, the request 1103 indicates a URL "http://www.host.com/res.htm." After the application/presentation layer, the resource access protocol identifier and the resource host identifier are stripped out of the request and the request is encrypted if the request is being transmitted over a secure resource access protocol session. At the transport layer, the request 1103 may be broken into fragments, but probably will not be since requests are typically small. At the transport layer, the stripped out resource access protocol identifier is used for the TCP encapsulation information 1105 that is added to the request 1103.

At the network layer, Internet Protocol (IP) encapsulation information 1107 is added to an IP packet payload 1109, which is the TCP encapsulation information 1105 and the request 1103. The IP packet payload 1109 with the IP encapsulation information 1107 is an IP packet 1111. The IP encapsulation information 1107 is based on the stripped out resource host identifier. Operations for resource locator identifier rewrite take place at the application/presentation layer when modifying a resource message and at the transport layer when modifying transport layer information (e.g., TCP encapsulation information) to comply with modifications made at the application/presentation layer.

FIG. 11B is a conceptual diagram illustrating exemplary processing of a response with reference to layers from the OSI reference model according to one embodiment of the invention. A response 1123 is illustrated next to the application/presentation layer. As the response 1123 is successively processed down the model at each layer, the response 1123 is modified and/or information is added and/or removed from the response 1123. Any rewrite is performed at the application/presentation layer. Rewrites performed to RLIs may not indicate a port and rely on a default port for the indicated resource access protocol or a port defined for the indicated resource host. For example, assume a RLI rewrite network security proxy has a configuration file with the following entries:

www.host1.com port 443
www.host2.com port 999

When a RLI rewrite network security proxy rewrites a RLI that has www.host1.com as the resource host identifier, it can either not indicate the port because the receiving client will use the default HTTPS port 443, or rewrite the resource host identifier as www.host1.com:443. For rewrites of RLIs having www.host2.com as the resource host identifier, the RLI rewrite network security proxy will include the port 999 in the resource host identifier of the rewritten URL (i.e., www.host2.com:999). In FIG. 11B, the response 1123 indicates HTTP but the configuration file indicates that requests for www.host1.com should be governed by HTTPS. Therefore, the RLI rewrite proxy will rewrite the RLI to "https://www.host1.com/res.htm." After performing rewrite the response 1123 will be encrypted if appropriate.

At the transport layer, the response 1123 may be broken into fragments. A response fragment 1126 is encapsulated with TCP encapsulation information 1125 in accordance with the resource access protocol session that the response will be transmitted over.

At the network layer, Internet Protocol (IP) encapsulation information 1127 is added to an IP packet payload, which is the TCP encapsulation information 1125 and the response fragment 1126. The IP packet payload 1129 with the IP encapsulation information 1127 is an IP packet 1131.

Figure 12:
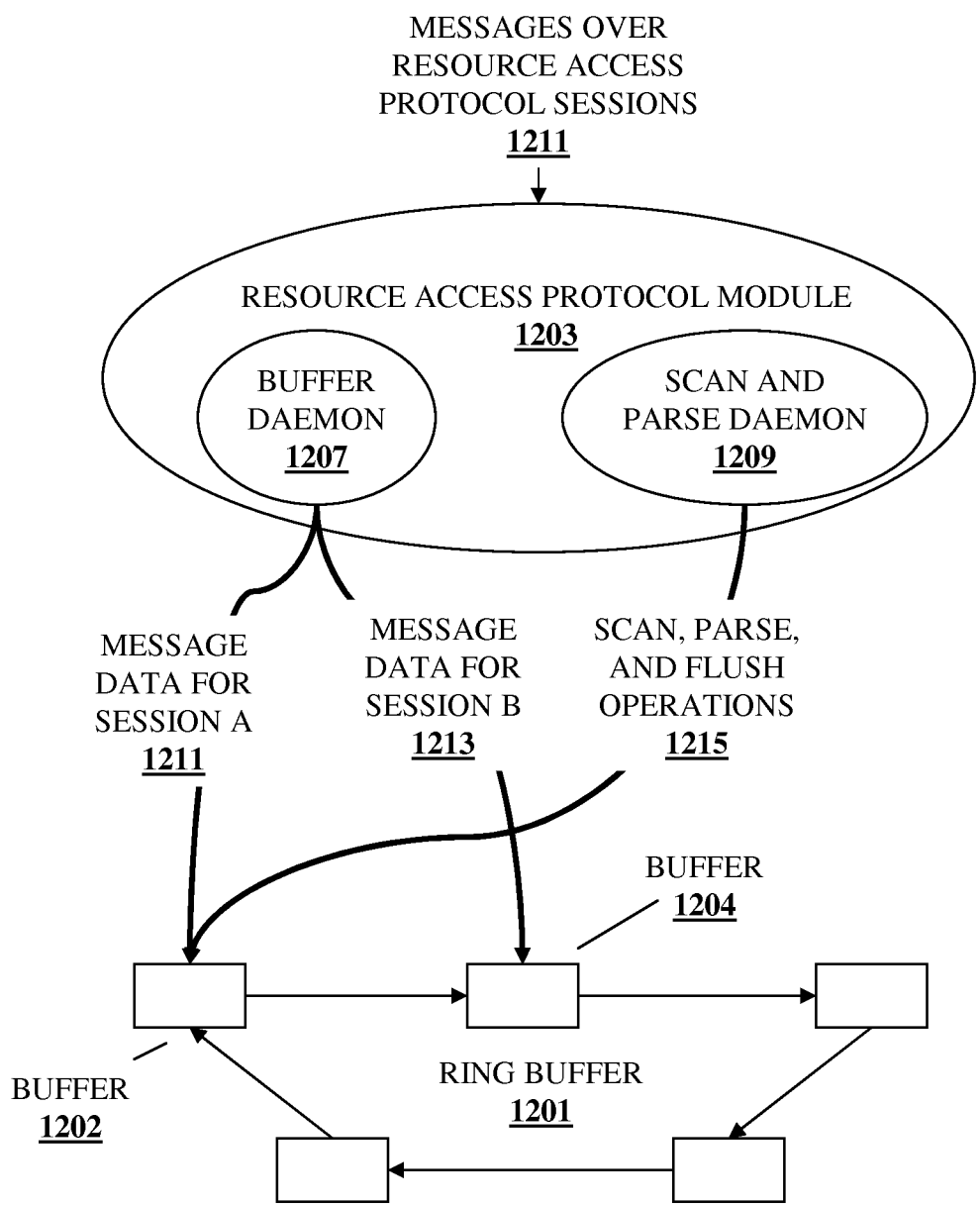
FIG. 12 is an exemplary conceptual diagram illustrating resource locator identifier rewrite with a ring buffer according to one embodiment of the invention.

FIG. 12 is an exemplary conceptual diagram illustrating resource locator identifier rewrite with a ring buffer according to one embodiment of the invention. In FIG. 12, a resource access protocol module 1203 receives resource messages 1211 over resource access protocol sessions. The resource access protocol module 1203 includes a buffer daemon 1207 and a scan and parse daemon 1209. The buffer daemon 1207 loads message data into a ring buffer 1201 and manages allocation and recycling of buffers for the ring buffer 1201. Message data may be an entire message or part of a message.

In FIG. 12, the buffer daemon 1207 is illustrated as loading message data 1211 for a session A into a buffer 1202 of the ring buffer 1201, and loading message data 1213 for a session B into a buffer 1204 of the ring buffer 1201. The individual buffers in a ring buffer can be defined with any size. In the ring buffer 1201, each individual buffer is defined with the same fixed size, although alternative embodiments of the invention provide for varying size buffers. In another embodiment of the invention, one ring buffer is allocated for resource requests and a second ring buffer is allocated for resource responses.

Numerous factors should be considered when defining the size of individual buffers. Since resource request messages are typically small, each buffer is defined with the capacity for at least a single resource request in one embodiment of the invention. In contrast, the typically varying sizes of larger responses may require multiple buffers. In the embodiment of the invention illustrated in FIG. 12, a session is limited to a single buffer within the ring buffer 1201. In other words, if the message data 1211 is not an entire message and fills the buffer 1202, then the remainder of the message data will not be loaded into the buffer 1202 or any other buffer until the message data 1211 in the buffer 1202 has been scanned, parsed, analyzed, and flushed.

In one embodiment of the invention chunk creation is related to the ring buffers while in another embodiment of the invention chunks are created in relation to each processed RLI. In an embodiment that relates chunk creation to the ring buffers, a chunk is created for each full set of message data from a buffer in the ring buffer. If a buffer holds 2 complete RLIs and 1 partial RLI, then a chunk will be created for all of the message data in the buffer including the 2 complete RLIs up to the partial RLI. The buffer will be flushed after processing up to the partial RLI, message data from the same message will be loaded into the buffer in addition to the partial RLI, and the next chunk will be created from all of the complete RLIs (including the RLI that was previously partial since it should be complete with newly loaded message data) after the message data in the buffer is processed.

The scan and parse daemon 1209 is illustrated in FIG. 12 as performing operations 1215. The operations 1215 include scan, parse, and flush operations. These operations are performed when certain items are being located in a message (e.g., header parameters, RLIs, etc.). In alternative embodiments of the invention the buffer daemon 1207 performs all loading and flush operations to the ring buffer 1201. In such embodiments of the invention, flags are utilized for the scan and parse daemon 1209 to communicate completion of operations on a buffer to the buffer daemon. In another embodiment of the invention, the resource access protocol module 1203 performs all of the operations without daemons. In another embodiment of the invention, the resource access protocol module 1203 utilizes a single daemon to perform all the operations on message data in the ring buffer 1201.

At some point before the scan and parse daemon 1209 begins to operate on the message data 1211 for Session A in the buffer 1202 and/or the message data 1213 for Session B in the buffer 1204, variables are initialized. An instance of the variables shown in Table 1 below is initialized for the message data 1211 and another instance for the message data 1213.

TABLE 1

Variables for Processing Message Data

| Variable | Example Values |
| --- | --- |
| Scan-and-Parse State | URL Scan, Version Scan, Header Scan, Parse, Complete |

TABLE 1-continued

Variables for Processing Message Data

| Variable | Example Values |
| --- | --- |
| Connection Search State | Boolean |
| Content-Length Search State | Boolean |
| Content-Length Data Size | Kilobytes |
| Transfer-Encoding Search State | Boolean |
| Transfer-Encoding Data State | Kilobytes |
| Persistent Connection Disabled | Boolean |
| Message Type | Response or Request |

Although in one embodiment of the invention, an administrator statically defines the "Persistent Connection Disabled" variable, in alternative embodiments of the invention this variable varies dynamically depending on the session. The variables in the table above are initialized as shown in table 2 below.

TABLE 2

Initializing of Variables

| Variable | Initialization |
| --- | --- |
| Scan-and-Parse State | IF Message Type = Response AND Persistent Connection Disabled = False THEN SET TO Header Scan ELSE SET TO Version Scan |
| Connection Search State | IF Persistent Connection Disabled = True THEN SET TO TRUE |
| Content-Length Search State | IF Message Type = Request AND Persistent Connection Disabled = TRUE OR Message Type = Response AND Persistent Connection Disabled = False THEN SET TO TRUE ELSE SET TO FALSE |
| Content-Length Data Size | 0 |
| Transfer-Encoding Search State | IF Message Type = Response AND Persistent Connection Disabled = False THEN SET TO TRUE ELSE SET TO FALSE |
| Transfer-Encoding Data State | 0 |
| Message Type | Based on Message |

The scan and parse daemon performs the following sequence of operations shown in Table 3 below depending on the values of the previously discussed variables on each buffer with message data.

TABLE 3

Sequence of Scan and Parse Operations on Message Data

| Operations | Controlling Variables |
| --- | --- |
| 1 SEARCH_FOR_VERSION → SET Scan-and-Parse State TO Header Search when complete IF Message Type = Response ELSE SET Scan-and-Parse State TO Parse | Scan-and-Parse State |
| 2 SEARCH_FOR_HEADER → SET Scan-and-Parse State TO URL Scan | Scan-and-Parse State |
| 3 SEARCH_HEADER_CONNECTION | Connection Search State |
| 4 SEARCH_HEADER_CONTENT_LENGTH | Content-Length Search State |
| 5 PARSE_COMPUTE_CONTENT_LENGTH | Content-Length Search State |
| 6 SEARCH_HEADER_TRANSFER_ENCODING | Transfer-Encoding Search State |
| 7 PARSE_BODY_BASED_ON_CONTENT_LENGTH | Transfer-Encoding Search State |

TABLE 3-continued

Sequence of Scan and Parse Operations on Message Data

| Operations | Controlling Variables |
|---|---|
| 8 PARSE_BODY_BASED_ON_TRANSFER_ENCODING | Transfer-Encoding Search State |

Table 4 below illustrates the relationships between the operations illustrated in Table 4 by row number, the operations illustrated in the flowcharts of FIGS. 5A-5B and 6A-6B, and the exemplary processes that perform the operations according to one embodiment of the invention.

TABLE 4

Relationships between Operations

| Scan and parse daemon | Resource Access Protocol Module |
|---|---|
| 1 | Downgrade Version (Blocks 507, 523 and 607) |
| 2 | Search for RLI that does not indicate appropriate request governing resource access protocol in Header and Rewrite (Block 415) |
| 3 | Modify Connection Parameter (Blocks 509 and 525) |
| 4 | Use to Skip Body if Message is Redirect Response Modify Parameter (Block 511) |
| 5 | Used for Header Rewrite |
| 6 | Use to Skip Body if Message is Redirect Response<br>Use to write over Content-Length parameter (Block 511) |
| 7 | Used to parse boundaries of messages (Blocks 609 and 624)<br>Used to convert content-length content to chunked transfer encoding content (Block 621) |
| 8 | Used to parse boundaries of messages (Blocks 609 and 624)<br>Used to convert content-length content to chunked transfer encoding content (Block 623) |

Table 5 below illustrates the sequence of operations, identified by row number from Table 3 that will be performed on the different types of message data.

TABLE 5

Sequence of operations for different message data

| Persistent Connection Disabled | | Persistent Connection Not Disabled | |
|---|---|---|---|
| Request | Response | Request | Response |
| 1 | 1 | 1 | 2 |
| 2 | 2 | 5 | 4 |
| 3 | 3 | 7 | 5 |
| 4 | | | 6 |
| | | | 7 |
| | | | 8 |

The variables persist for a given message as long as the entire message has not been processed. For example, the instance of the variables for the message data 1211 will persist until the entire message corresponding to the message data 1211 has been completely processed. In one embodiment of the invention, once the entire message has been processed, the buffer 1202 is returned to a memory pool.

In alternative embodiments of the invention, a temporary buffer is allocated for processed message data. For example, addition data (e.g., header data) may need to be inserted into message data. Once the data that should be before the header data has been scanned and processed, it is loaded from the ring buffer into an allocated temporary buffer. The header data is inserted and/or space is reserved for additional data in the temporary buffer. After the insertion and/or reservation, the rest of the message data from the ring buffer is loaded into the temporary buffer. The processed message data with the additional data and/or the reserved space can be reloaded into the ring buffer or another memory. Afterwards, the temporary buffer can be de-allocated.

It should be understood that the operations illustrated in Tables 1-5 are for illustrative purposes and not meant to be limiting upon the invention.

Alternative Embodiments

While the invention has been described in terms of several embodiments, those skilled in the art will recognize that the invention is not limited to the embodiments described. For instance, while the flow diagrams show a particular order of operations performed by certain embodiments of the invention, it should be understood that such order is exemplary (e.g., alternative embodiments may perform the operations in a different order, combine certain operations, overlap certain operations, etc.). For example, with reference to FIG. 5B, block 526 is performed before blocks 523 and/or 525 in an alternative embodiments of the invention. With reference to FIG. 6B, block 623 is performed before blocks 619, 621, and/or 622 in an alternative embodiments of the invention.

Thus, the method and apparatus of the invention can be practiced with modification and alteration within the spirit and scope of the appended claims. The description is thus to be regarded as illustrative instead of limiting on the invention.

What is claimed is:

1. A method of processing a resource response, the method comprising:
   receiving a response from a resource host over a non-secure hypertext transfer protocol (HTTP) session;
   determining whether a content type of the response is text; and
   processing the response in accordance with the determination as to whether the content type of the response is text,
      wherein the response is sent directly to a client device via a secure resource access protocol when the content type is not text, and
      wherein the response is modified when the content type is text, the modification applied to at least one resource locator identifier (RLI) in the message that does not designate a secure resource protocol, the RLI modified to designate a secure resource protocol, and wherein the response including the modified RLI is sent via the secure resource access protocol session to the client device.

2. The method of claim 1, wherein the response is received by a network security proxy.

3. The method of claim 2, wherein the response is first received by a content switch, and wherein the content switch forwards the response to the network security proxy.

4. The method of claim 1, further comprising encrypting the response after modifying the RLI to designate a secure resource protocol.

5. The method of claim 3, wherein the response is sent through the content switch to client device.

6. The method of claim 1, further comprising receiving a request from the client device before receiving the response from the resource host.

7. The method of claim 6, wherein the request is encrypted and the method further comprising:
decrypting the request by a network security proxy; and
sending the decrypted request to the resource host.

8. The method of claim 7, wherein the request is first received by a content switch, and wherein the content switch forwards the request to the network security proxy.

9. A non-transitory computer readable storage medium having embodied thereon a program executable by a processor to perform a method of processing a resource response, the method comprising:
receiving a response from a resource host over a non-secure hypertext transfer protocol (HTTP) session;
determining whether a content type of the response is text; and
processing the response in accordance with the determination as to whether the content type of the response is text,
wherein the response is sent directly to a client device via a secure resource access protocol when the content type is not text, and
wherein the response is modified when the content type is text, the modification applied to at least one resource locator identifier (RLI) in the message that does not designate a secure resource protocol, the RLI modified to designate a secure resource protocol, and wherein the response including the modified RLI is sent via the secure resource access protocol session to the client device.

10. The non-transitory computer readable storage medium of claim 9, wherein the response is received by a network security proxy.

11. The non-transitory computer readable storage medium of claim 10, wherein the response is first received by a content switch, and wherein the content switch forwards the response to the network security proxy.

12. The non-transitory computer readable storage medium of claim 9, the program being further executable to encrypt the response after modifying the RLI to designate a secure resource protocol.

13. The non-transitory computer readable storage medium of claim 11, wherein the response is sent through the content switch to the client device.

14. The non-transitory computer readable storage medium of claim 9, the program being further executable to receive a request from the client device before receiving the response from the resource host.

15. The non-transitory computer readable storage medium of claim 14, wherein the request is encrypted and the program being further executable to:
decrypt the request by a network security proxy; and
send the decrypted request to the resource host.

16. The non-transitory computer readable storage medium of claim 15, wherein the request is first received by a content switch, and wherein the content switch forwards the request to the network security proxy.

17. An apparatus processing a resource response, the apparatus comprising:
a processor;
a memory; and
a data communication network interface, wherein the processor executing instructions stored in the memory:
receives a response from a resource host over a non-secure hypertext transfer protocol (HTTP) session;
determines whether a content type of the response is text; and
processes the response in accordance with the determination as to whether the content type of the response is text;
sends the response directly to a client device via a secure resource access protocol when the content type is not text through the data communication network interface; and
modifies the response when the content type is text, the modification applied to at least one resource locator identifier (RLI) in the message that does not designate a secure resource protocol, the RLI modified to designate a secure resource protocol, and wherein the response including the modified RLI is sent via the secure resource access protocol session to the client device.

18. The apparatus of claim 17, wherein the response is first received by a content switch, and wherein the content switch forwards the response to the processor through the data communication network interface, and wherein the processor sends the response or the modified response to the client device via the secure resource access protocol through data communication network interface and the content switch.

19. The apparatus of claim 17, wherein the processor encrypts the response after modifying the RLI to designate a secure resource protocol.

20. The apparatus of claim 17, wherein a request from a client device is received over the data communication network before the response from the resource host is received over the data communication network.

* * * * *